United States Patent
Kurokawa

(10) Patent No.: US 10,397,440 B2
(45) Date of Patent: Aug. 27, 2019

(54) IMAGE FORMATION POSITION ADJUSTMENT METHOD

(71) Applicant: KYOCERA Document Solutions Inc., Osaka-shi (JP)

(72) Inventor: Yuichiro Kurokawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/253,328

(22) Filed: Jan. 22, 2019

(65) Prior Publication Data
US 2019/0230245 A1   Jul. 25, 2019

(30) Foreign Application Priority Data

Jan. 25, 2018  (JP) ................... 2018-010777

(51) Int. Cl.
*H04N 1/00* (2006.01)
*H04N 1/387* (2006.01)
*G06K 15/02* (2006.01)

(52) U.S. Cl.
CPC ......... *H04N 1/3872* (2013.01); *G06K 15/027* (2013.01); *H04N 1/00702* (2013.01); *H04N 1/00761* (2013.01)

(58) Field of Classification Search
CPC ............. H04N 1/3872; H04N 1/00761; H04N 1/00702; G06K 15/027
See application file for complete search history.

(56) References Cited

U.S. PATENT DOCUMENTS

| | | | | |
|---|---|---|---|---|
| 9,756,208 | B2* | 9/2017 | Tagawa | H04N 1/0464 |
| 2007/0177210 | A1* | 8/2007 | Yamaguchi | H04N 1/387 358/1.18 |
| 2009/0231605 | A1* | 9/2009 | Kuwahara | B41J 29/393 358/1.9 |
| 2009/0231621 | A1* | 9/2009 | Kuwahara | B41J 29/02 358/1.15 |
| 2015/0249764 | A1* | 9/2015 | Nakatani | G03G 15/0131 358/1.5 |

FOREIGN PATENT DOCUMENTS

| | | |
|---|---|---|
| JP | 2004-303156 | 10/2004 |
| JP | 2005-138489 | 6/2005 |

* cited by examiner

*Primary Examiner* — Neil R McLean
(74) *Attorney, Agent, or Firm* — Gerald E. Hespos; Michael J. Porco; Matthew T. Hespos

(57) ABSTRACT

A method includes operating a computer of an image forming apparatus, using, as a target image, an adjustment image including a center image representing a center thereof in a width direction, to: perform test processing of generating a print image by superimposing an outline image on an adjustment image after further shifting the outline image in the width direction by a first distance, and then executing printing processing; and adjust a relative position such that each of a difference between the first distance and a length in the width direction of a margin region lying along one lateral edge of a sheet, and a spaced-apart distance between the center of the sheet in the width direction and the center of the adjustment image in the width direction, represented by the center image formed on the sheet, becomes 0.

5 Claims, 15 Drawing Sheets

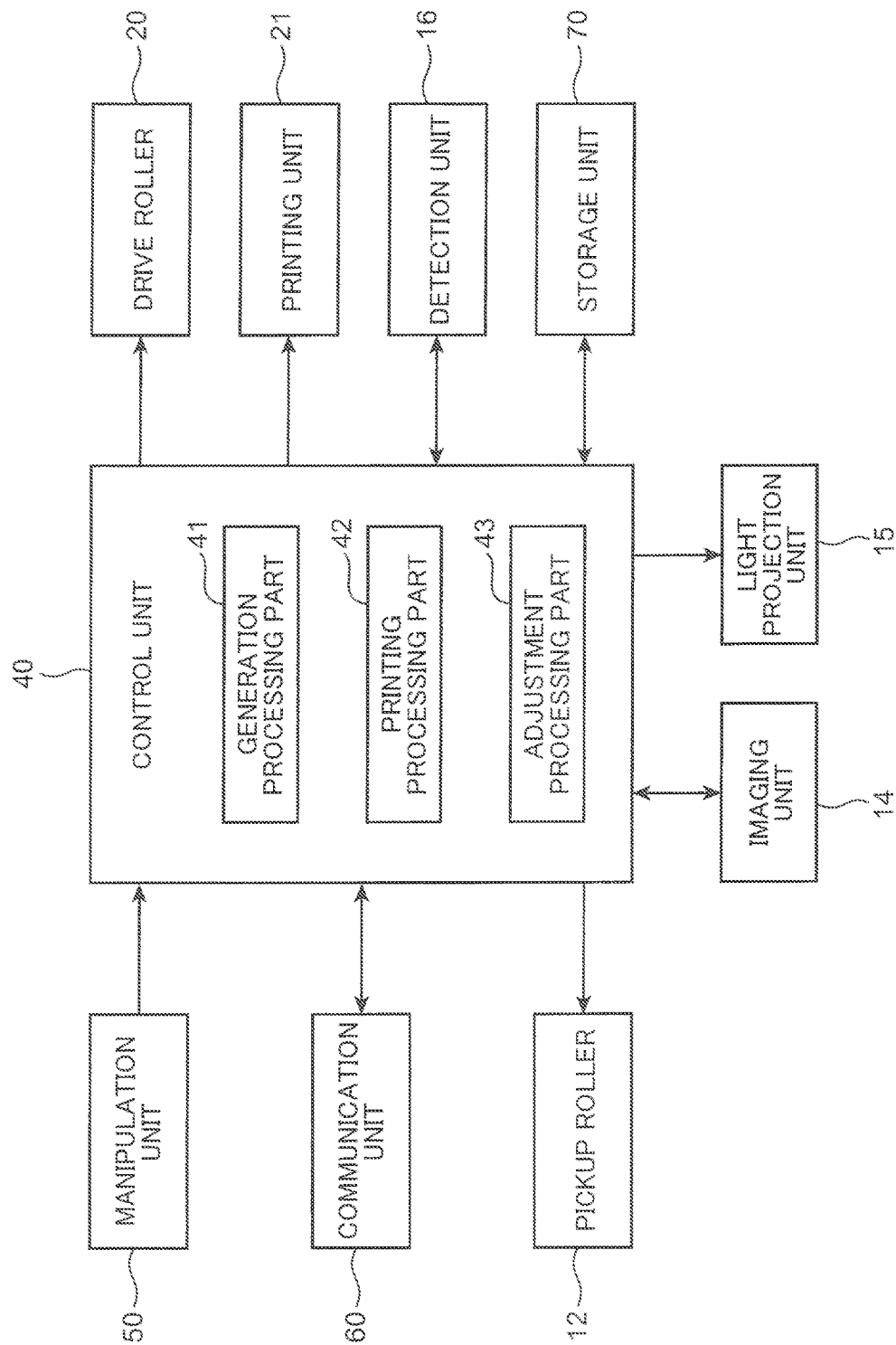

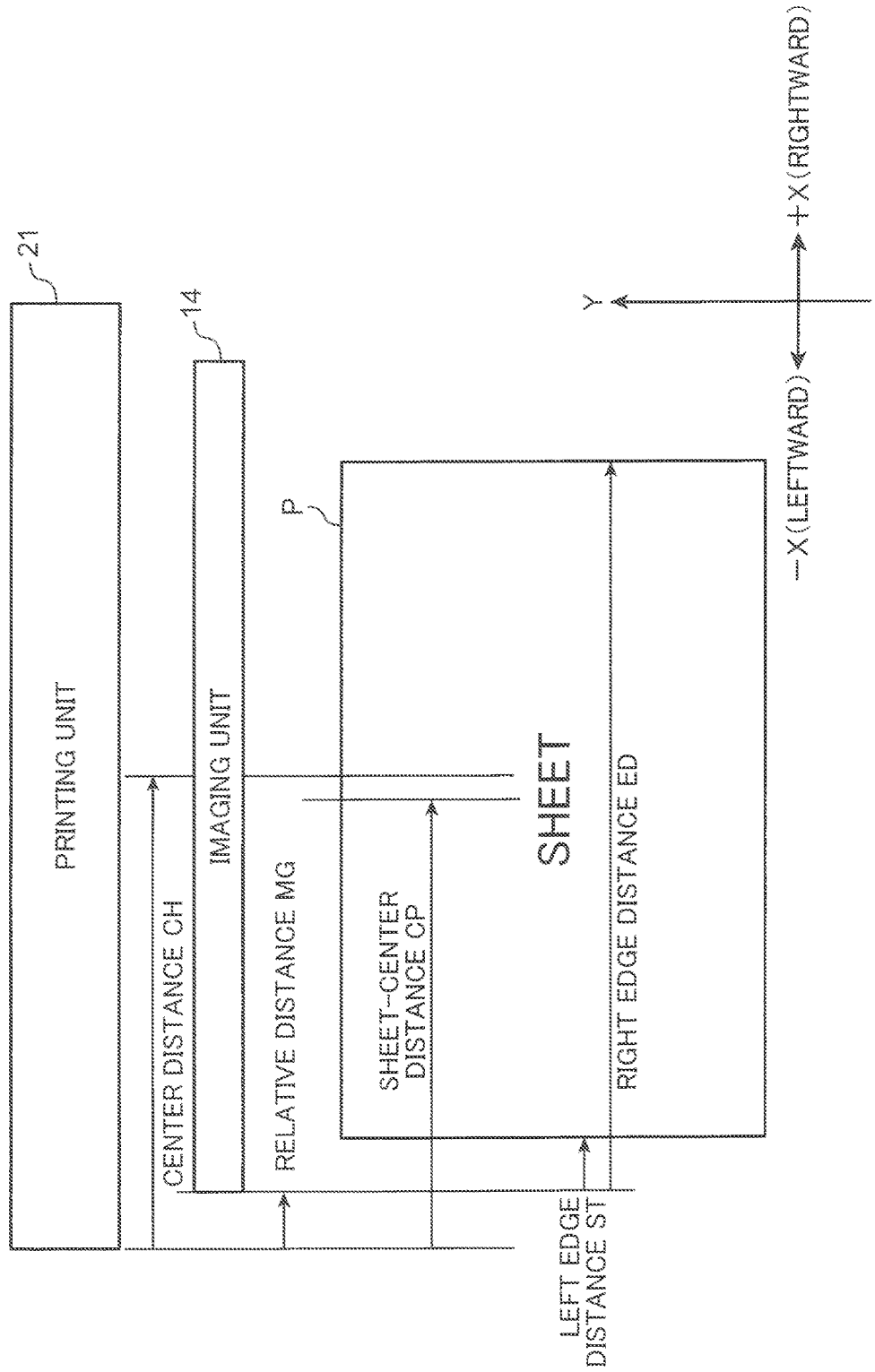

IN CASE WHERE IMAGING UNIT HAS NO POSITIONAL DEVIATION

IN CASE WHERE IMAGING UNIT DEVIATES RIGHTWARDLY

IN CASE WHERE IMAGING UNIT DEVIATES LEFTWARDLY

FIG. 5A  IN CASE WHERE PRINTING UNIT HAS NO POSITIONAL DEVIATION
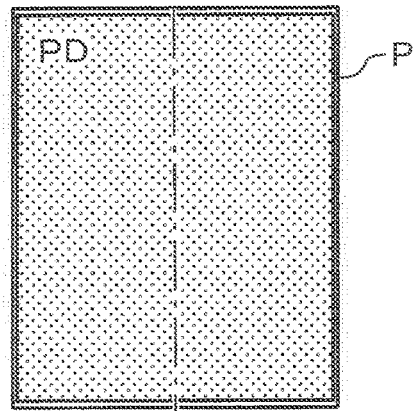
FIG. 5B  IN CASE WHERE PRINTING UNIT DEVIATES LEFTWARDLY
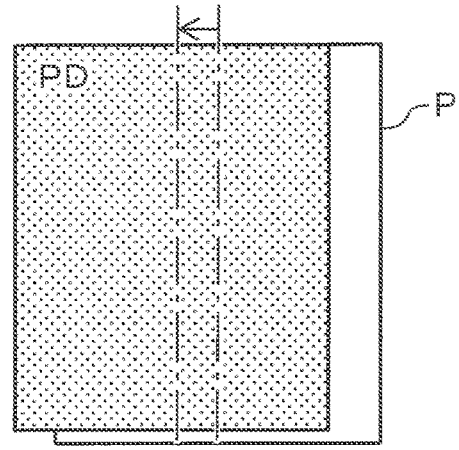
FIG. 5C  IN CASE WHERE PRINTING UNIT DEVIATES RIGHTWARDLY
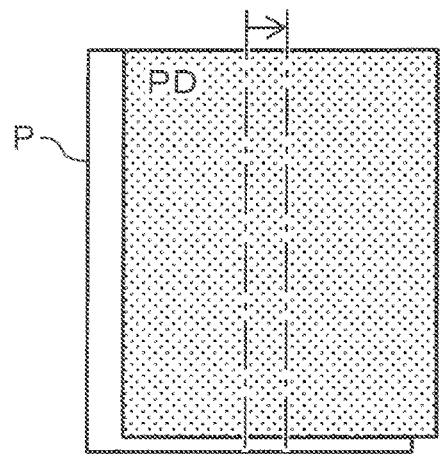

IN CASE WHERE PRINTING UNIT HAS NO POSITIONAL DEVIATION

IN CASE WHERE PRINTING UNIT DEVIATES ON DOWNSTREAM SIDE IN CONVEYANCE DIRECTION Y

IN CASE WHERE PRINTING UNIT DEVIATES ON UPSTREAM SIDE IN CONVEYANCE DIRECTION Y

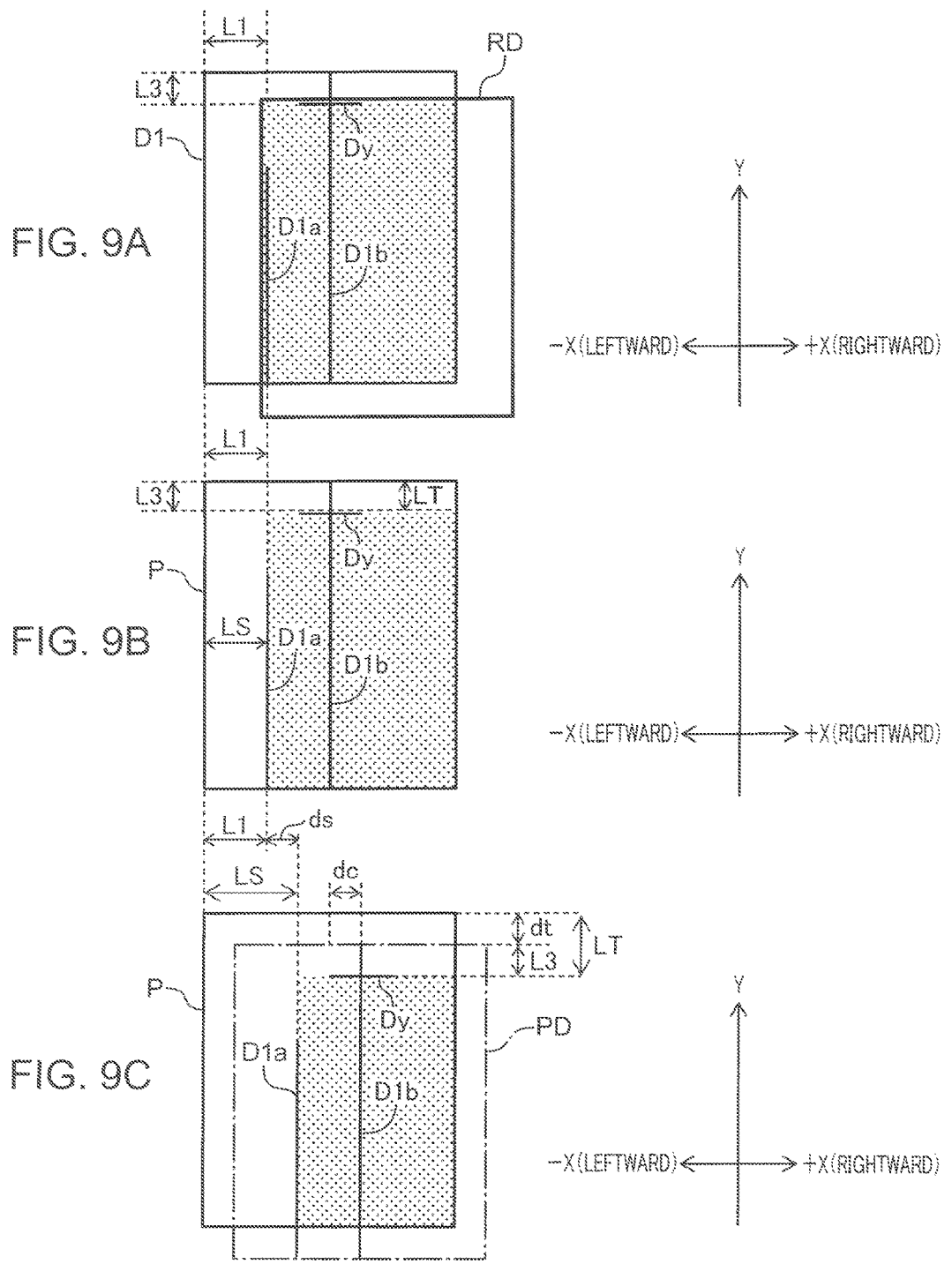

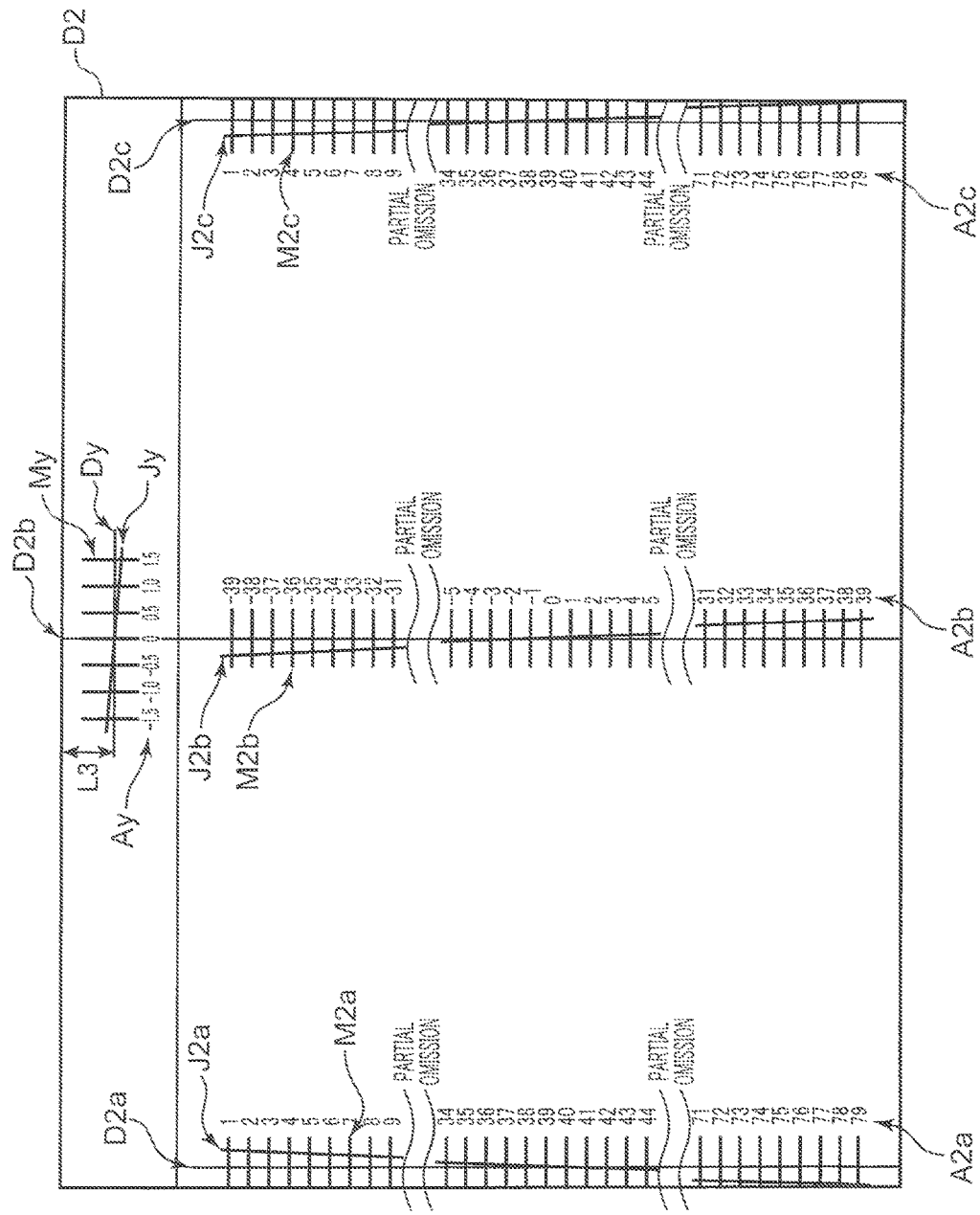

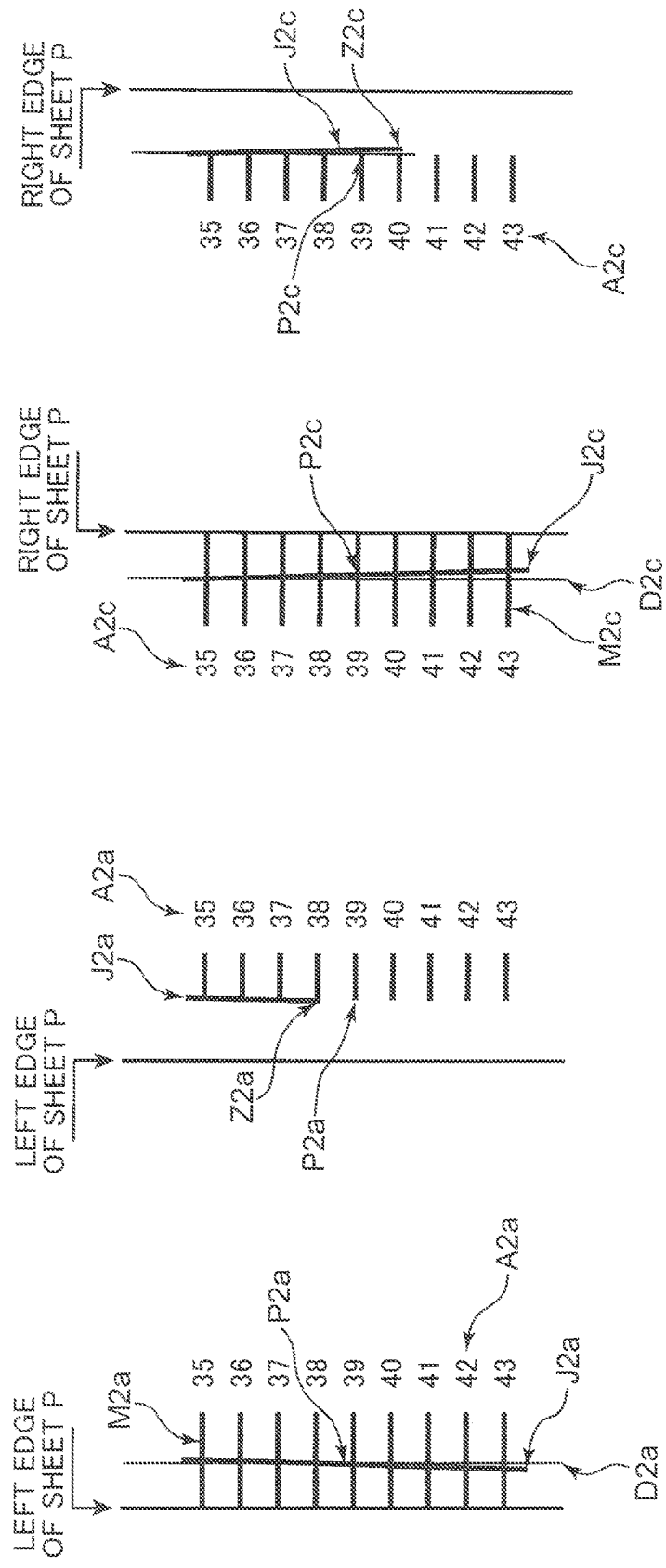

IMAGE FORMATION POSITION ADJUSTMENT METHOD

INCORPORATION BY REFERENCE

This application is based on Japanese Patent Application Serial No. 2018-010777 filed in Japan Patent Office on Jan. 25, 2018, the contents of which are hereby incorporated by reference.

BACKGROUND

The present disclosure relates to a method for adjustment of an image formation position in an image forming apparatus.

Generally, in an image forming apparatus such as an ink-jet printer or a laser printer, an image formation position (i.e., the position of an image to be formed) according to a printing unit such as a developing unit or a transfer unit is set based on a disposed position of the printing unit, and will never be changed from the set position. On the other hand, a sheet conveyance position (i.e., the position of a sheet to be conveyed) with respect to the printing unit can deviate from a preset conveyance position, due to a design tolerance or an assembly tolerance of a sheet conveyance passage, a sheet size, a loading state of sheets on a sheet feeding unit, and the like. Moreover, due to conveyance noise caused by motors, rollers, meshed gears and the like used for sheet conveyance, the sheet conveyance position can vary every time one sheet is conveyed. As above, even if the image formation position according to the printing unit is not changed, there is a possibility that a deviation occurs in the sheet conveyance position with respect to the printing unit, resulting in failing to form an image on a sheet at a proper position.

In order to solve this problem, there has heretofore been known a technique of: disposing an image sensor at a position upstream of the printing unit in a sheet conveyance direction; calculating a deviation of the sheet conveyance position, based on the center of the image formation position determined based on a disposed position of an ink head, and positions of opposite lateral edges of a sheet detected by the image sensor; and moving the image formation position in conformity to the calculated deviation.

Further, there has heretofore been known a technique of: using the above image sensor to detect an outline of a sheet being conveyed with respect to the printing unit; and using a heretofore-known masking processing to form, on a sheet, an image obtained by masking any region which is not included inside the detected outline of the sheet, thereby preventing a developer such as an ink or toner from adhering to any region other than the sheet.

SUMMARY

The present disclosure provides a method for adjustment of an image formation position in an image forming apparatus. The image forming apparatus includes a printing unit, an imaging unit, a storage unit, a generation processing part, and a printing processing part. The printing unit forms an image on a sheet conveyed thereto. The imaging unit takes an outline image representing an outline of the sheet, at a position upstream of the printing unit in a conveyance direction of the sheet. The storage unit preliminarily stores a relative position of the imaging unit with respect to the printing unit in a width direction orthogonal to the conveyance direction. The generation processing part superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region. The printing processing part executes printing processing of causing the printing unit to form the print image on the sheet, such that a center of the print image in the width direction becomes coincident with a center of the sheet in the width direction, based on the relative position. The method comprises operating a computer of the image forming apparatus, using, as the target image, a given adjustment image including a center image representing a center thereof in the width direction, to: perform test processing of causing the generation processing part to generate the print image by superimposing the outline image on the adjustment image after further shifting the outline image in the width direction by a given first distance, and then causing the printing processing part to execute the printing processing; and adjust the relative position such that each of a difference between the first distance and a length in the width direction of a margin region lying along the one lateral edge of the sheet, and a spaced-apart distance between the center of the sheet in the width direction and the center of the adjustment image in the width direction, represented by the center image formed on the sheet, becomes 0.

The present disclosure further provides a method for adjustment of an image formation position in an image forming apparatus. The image forming apparatus includes a printing unit, an imaging unit, a storage unit, a generation processing part, and a printing processing part. The printing unit forms an image on a sheet conveyed thereto. The imaging unit takes an outline image representing an outline of the sheet, at a position upstream of the printing unit in a conveyance direction of the sheet. The storage unit preliminarily stores a relative position of the imaging unit with respect to the printing unit in a width direction orthogonal to the conveyance direction. The generation processing part superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region. The printing processing part executes printing processing of causing the printing unit to form the print image on the sheet, such that a center of the print image in the width direction becomes coincident with a center of the sheet in the width direction, based on the relative position. The method comprises operating a computer of the image forming apparatus, using, as the target image, a given adjustment image including a center image representing a center thereof in the width direction, to: perform test processing of causing the generation processing part to generate the print image, and, after changing, to a margin region, a region of the print image from each of opposite lateral edges of the print image to a position spaced apart from the lateral edge in the width direction by a second distance, causing the printing processing part to execute the printing processing; and adjust the relative position such that each of a difference between the second distance and a length in the width direction of a margin region lying along each of opposite lateral edges of the sheet, and a spaced-apart distance between the center of the sheet in the width direction and the center of the adjustment image in the width direction, represented by the center image formed on the sheet, becomes 0.

The present disclosure further provides a method for adjustment of an image formation position in an image forming apparatus. The image forming apparatus includes a printing unit, an imaging unit, a storage unit, a generation processing part, a printing processing part, and a detection unit. The printing unit forms an image on a sheet conveyed thereto. The imaging unit takes an outline image representing an outline of the sheet, at a position upstream of the printing unit in a conveyance direction of the sheet. The storage unit preliminarily stores a relative position of the imaging unit with respect to the printing unit in a width direction orthogonal to the conveyance direction. The generation processing part superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region. The printing processing part executes printing processing of causing the printing unit to form the print image on the sheet, such that a center of the print image in the width direction becomes coincident with a center of the sheet in the width direction, based on the relative position. The detection unit detects that a leading edge of the sheet reaches a given position between the printing unit and the imaging unit in the conveyance direction. The storage unit further preliminarily stores a conveyance time period necessary to convey the sheet from the detection unit to the printing unit. At a printing start time immediately after the conveyance time period has elapsed from a time when the detection unit detected reaching of the leading edge of the sheet, the generation processing part superimposes the outline image on the target image step-by-step in increments of given lines extending in the width direction to sequentially generate a plurality of segments of the print image each for the given lines. Upon start of generation of the print image by the generation processing part, the printing processing part starts the printing processing to cause the printing unit to sequentially form, on the sheet, the plurality of segments of the print image generated by the generation processing part in increments of the given lines. The method comprises operating a computer of the image forming apparatus, using, as the target image, a given adjustment image including a leading edge image representing a position spaced apart from a leading edge of the adjustment image in a direction opposite to the conveyance direction by a third distance over which the sheet is conveyed in a given first time period, to; in a period from the printing start time through until the first time period elapses, cause the generation processing part to sequentially generate images each serving as one segment of the print image for given lines, by modifying the adjustment image such that a region thereof corresponding to the given lines is converted to a margin region, without superimposing the outline image on the adjustment image; and after completion of the printing processing, adjust the conveyance time period such that a difference between the third distance and a length in the conveyance direction of a margin region lying along the leading edge of the sheet becomes 0.

BRIEF DESCRIPTION OF THE DRAWINGS

FIG. 2 is a block diagram depicting an electrical configuration of the ink-jet printer.

FIG. 3 is a diagram depicting a positional relationship among a sheet, an imaging unit and a printing unit.

FIG. 5A is an explanatory diagram for processing to be executed by the printing processing part to form the print image on a sheet, in a state in which the width-directional center of the print image is coincident with the width-directional center of the sheet.

FIG. 5B is an explanatory diagram for the processing to be executed by the printing processing part to form the print image on a sheet, in the state in which the width-directional center of the print image is coincident with the width-directional center of the sheet.

FIG. 5C is an explanatory diagram for the processing to be executed by the printing processing part to form the print image on a sheet, in the state in which the width-directional center of the print image is coincident with the width-directional center of the sheet.

FIG. 9A is an explanatory diagram for test processing to be performed using the first adjustment image.

FIG. 9B is an explanatory diagram for the test processing to be performed using the first adjustment image.

FIG. 9C is an explanatory diagram for the test processing to be performed using the first adjustment image.

FIG. 13 is a diagram depicting one example of a second adjustment image.

FIG. 15A is an explanatory diagram for an adjustment method based on a difference between a second distance and the width-directional length of a margin region lying along each of opposite lateral edges of a sheet after being subjected to the test processing.

FIG. 15B is an explanatory diagram for the adjustment method based on the difference between the second distance and the width-directional length of the margin region lying along each of the lateral edges of the sheet after being subjected to the test processing.

FIG. 15C is an explanatory diagram for the adjustment method based on the difference between the second distance and the width-directional length of the margin region lying along each of the lateral edges of the sheet after being subjected to the test processing.

FIG. 15D is an explanatory diagram for the adjustment method based on the difference between the second distance and the width-directional length of the margin region lying along each of the lateral edges of the sheet after being subjected to the test processing.

DETAILED DESCRIPTION

With reference to the drawings, a first embodiment of an adjustment method in accordance with the present disclosure will now be described. An image forming apparatus to which the adjustment method in accordance with the present disclosure is applicable includes electronic devices capable of forming an image on a sheet, such as an ink-jet printer, a laser printer, a copier, a facsimile machine, and a complex machine combining functions of two or more of them. Here, the sheet is not limited to a commonly-used printing paper, but may be a printable recording medium such as a transparent film. With regard to the following embodiment, the description will be made on the assumption that an image forming apparatus to which the adjustment method in accordance with the present disclosure is applied is an ink-jet printer capable of performing black-and-white printing. However, it should be understood that the image forming apparatus may be an ink-jet printer capable of performing color printing.

First Embodiment

Figure 1:
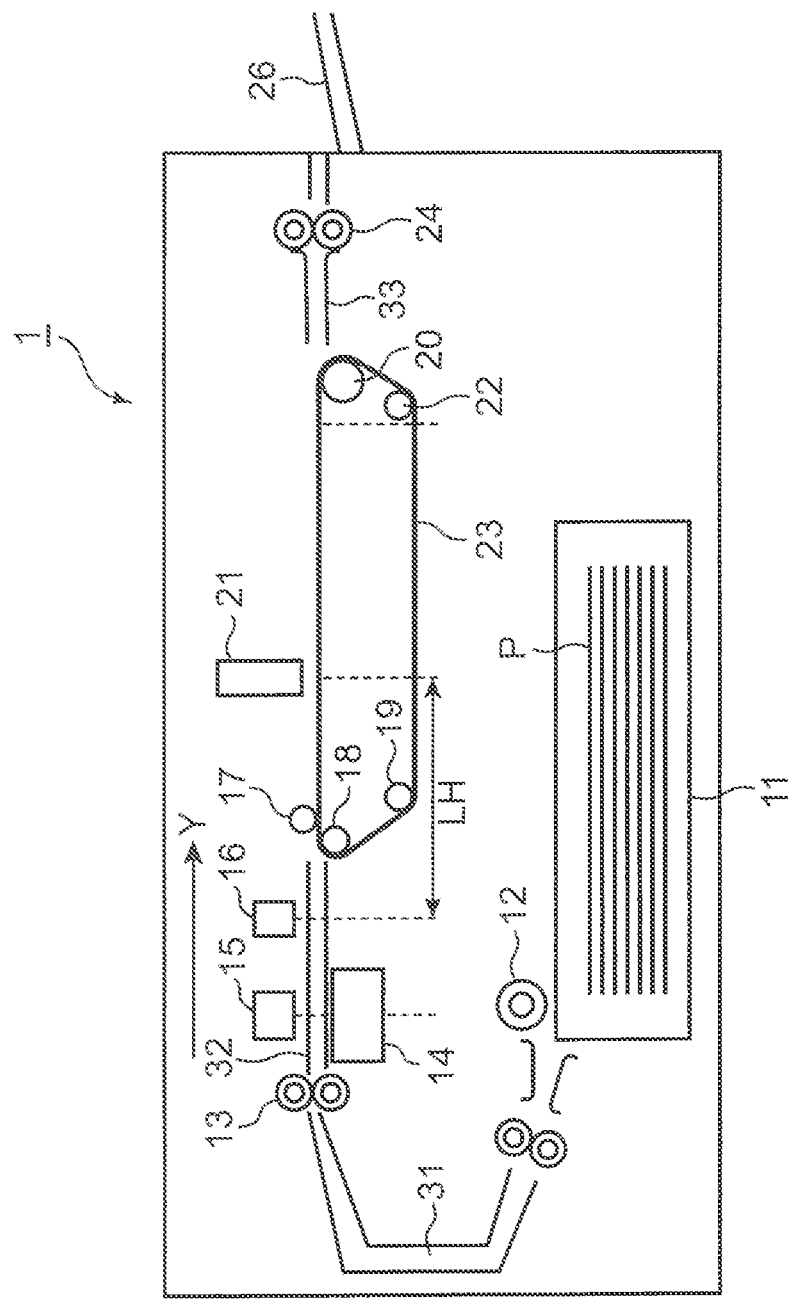
FIG. 1 is a sectional side view of an ink-jet printer.

FIG. 1 is a sectional side view of an ink-jet printer 1. As depicted in FIG. 1, the ink-jet printer 1 comprises a sheet cassette 11, a pickup roller 12, a registration roller pair 13, a light projection unit 15, an imaging unit 14, a detection unit 16, an attaching roller 17, a conveyance belt 23, a printing unit 21, an ejection roller pair 24, and an ejection tray 26.

A plurality of sheets P in an unprinted state are housed in the sheet cassette 11 in a stacked manner. According to drive of the pickup roller 12, the sheets P are extracted from the sheet cassette 11 one-by-one, and fed to a first conveyance passage 31. The registration roller pair 13 is operable to convey the sheet P having passing through the first conveyance passage 31 to a second conveyance passage 32.

The light projection unit 15 is disposed at a position opposed to the imaging unit 14 across the second conveyance passage 32. The light projection unit 15 is operable to emit light toward the imaging unit 14. The light projection unit 15 is composed of, e.g., an LED (Light Emitting Diode).

The imaging unit 14 is disposed at a position upstream of the printing unit 21 in a conveyance direction Y of the sheet P. The imaging unit 14 is operable to take an outline image representing an outline of the sheet P being conveyed along the second conveyance passage 32. The outline of the sheet P includes: a leading edge and a trailing edge which are located on opposite sides in the conveyance direction Y of the sheet P; and two lateral edges which are located on opposite sides in a direction orthogonal to the conveyance direction Y of the sheet P (this direction will hereinafter be referred to as "width direction X"). Further, in a case where a punched hole is provided in the sheet P, an outer edge of the punched hole is also included in the outline of the sheet P. The imaging unit 14 is composed of, e.g., an image sensor such as a CIS (Contact Image Sensor). The imaging unit 14 is operable, when the sheet P being conveyed along the second conveyance passage 32 is irradiated with light emitted from the light projection unit 15, to image an area in which a large luminance difference has occurred, as the outline of the sheet P.

The detection unit 16 is disposed between the imaging unit 14 and the printing unit 21 in the conveyance direction Y of the sheet P. The detection unit 16 is operable to detect that the leading edge of the sheet P being conveyed along the second conveyance passage 32 has just reached a disposed position (given position) of the detection unit 16. The detection unit 16 is composed of, e.g., a reflective photo-sensor. In this case, the detection unit 16 is operable to emit light toward the second conveyance passage 32, and detect the reaching of the leading edge of the sheet P, when receiving light reflected by the sheet P being conveyed along the second conveyance passage 32.

The sheet P having passed through the second conveyance passage 32 is conveyed to a position opposed to the printing unit 21 via a nip zone between the attaching roller 17 and the conveyance belt 23. The attaching roller 17 is disposed to be in contact with the conveyance belt 23. The attaching roller 17 is operable to press the sheet P against the conveyance belt 23 so as to allow the sheet P to be attached to the conveyance belt 23. The conveyance belt 23 is operable to convey the sheet P to the position opposed to the printing unit 21, while fixedly holding the sheet P by means of, e.g., electrostatic attraction. For example, an endless-shaped belt obtained by superimposing and bonding opposite ends of a dielectric resin sheet together, or a seamless belt made of a dielectric resin, is used as the conveyance belt 23. The conveyance belt 23 is wound around among a driven roller 18 and a drive roller 20 disposed, respectively, on upstream and downstream sides in the conveyance direction Y, and two tension rollers 19, 22. When the drive roller 20 is rotated in a clockwise direction on the drawing sheet of FIG. 1, the conveyance belt 23 is endlessly moved in a clockwise direction while the driven roller 18 is rotated interlockingly. Thus, the sheet P having passed through the nip zone between the attaching roller 17 and the conveyance belt 23 is conveyed in the conveyance direction Y to reach the position opposed to the printing unit 21. The tension rollers 19, 22 are provided as a means to apply a tension to the conveyance belt 23 so as to prevent the conveyance belt 23 from sagging between the drive roller 20 and the driven roller 18.

The printing unit 21 is disposed inside a housing of the ink-jet printer 1. The printing unit 21 is operable to jet black ink drops toward the sheet P conveyed by the conveyance belt 23 to thereby form an image on the sheet P. Examples of an ink jetting method to be performed by the printing unit 21 include a piezoelectric method configured to push out ink drops using a piezoelectric element, and a thermal ink jet method configured to generate gas bubbles by the heating element and jet ink drops by the resulting pressure.

The sheet P having an image formed by the printing unit 21 is further conveyed to pass through an ejection conveyance passage 33, and ejected to the ejection tray 26 by the ejection roller pair 24. The ink-jet printer 1 may further comprise a cleaning device or the like for removing ink adhering to a surface of the conveyance belt 23.

FIG. 2 is a block diagram depicting an electrical configuration of the ink-jet printer 1. As depicted in FIG. 2, the ink-jet printer 1 comprises a control unit 40, a manipulation unit 50, a communication unit 60, and a storage unit 70, in addition to the pickup roller 12, the imaging unit 14, the light projection unit 15, the detection unit 16, the drive roller 20, and the printing unit 21.

The control unit 40 is composed of, e.g., a microcomputer comprising: a CPU (Central Processing Unit) for executing a given computational processing; a non-volatile memory such as EEPROM (Electrically Erasable and Programmable Read Only Memory), which preliminarily stores therein a given control program; a RAM (Random Access Memory) for temporarily storing data therein; and peripheral circuits thereof. The control unit 40 is operable to execute processes based on the given control program in response to an instruction signal or the like input by a user. In this way, the control unit 40 can generally control the ink-jet printer 1 through output of instruction signals to respective units or devices, transfer of data, and others.

By executing the control program stored in the non-volatile memory or the like, the control unit 40 acts as a generation processing part 41, a printing processing part 42, and an adjustment processing part 43. Details of each of the generation processing part 41, the printing processing part 42 and the adjustment processing part 43 will be described later.

The manipulation unit 50 comprises a display panel capable of enabling a user to visually check a manipulation screen, an error message, and others, and a plurality of manipulation buttons for inputting various operational instructions. Although not depicted in FIG. 1, the manipulation unit 50 is provided on an upper surface or the like of a printer body of the ink-jet printer 1.

The communication unit 60 comprises various communication interface circuits for performing communication with an external device. For example, the communication unit 60 is operable, in response to receiving image data from an external computer together with a printing instruction signal, to output the received printing instruction signal and image data to the control unit 40. In response, the control unit 40 is operable to output control signals to respective units or devices to perform processing of forming an image represented by the image data, on the sheet P.

The storage unit 70 is composed of, e.g., a storage device such as an HDD (Hard Disk Drive), and operable to store therein various data under control of the control unit 40. For example, image data or the like input from the communication unit 60 into the control unit 40 is stored in the storage unit 70.

Further, the storage unit 70 preliminarily stores therein a setup value pertaining to image formation. FIG. 3 is a diagram depicting a positional relationship among the sheet P, the imaging unit 14 and the printing unit 21. In FIG. 3, a direction from the lower side toward the upper side on the drawing sheet is defined as the conveyance direction Y. Further, in the width direction X orthogonal to the conveyance direction Y, a direction toward the left side on the drawing sheet, and a direction toward the right side on the drawing sheet, are defined, respectively, as a leftward direction or −X direction, and a rightward direction or +X direction.

Specifically, the storage unit 70 preliminarily stores therein a setup value of a center distance CH which is a spaced-apart distance from a leftward lateral edge (one of opposite lateral edges) to the width (X)-directional center (the center in the width direction X) of the printing unit 21, as depicted in FIG. 3. Further, as a setup value representing a relative position of the imaging unit 14 with respect to the printing unit 21 in the width direction X, the storage unit 70 preliminarily stores therein a setup value of a relative distance MG which is a spaced-apart distance between a leftward lateral edge (hereinafter referred to as "left edge") of the printing unit 21 and a left edge of the imaging unit 14. Furthermore, the storage unit 70 preliminarily stores therein a setup value of a spaced-apart distance LH (FIG. 1) between the detection unit 16 and the printing unit 21 in the conveyance direction Y, a setup value of a conveyance time period TT (which is not indicated in the figures) necessary for conveying the sheet P by the spaced-apart distance LH from the detection section 16 to the printing unit 21, and others.

<Details of Control Unit 40>

Figure 4A:
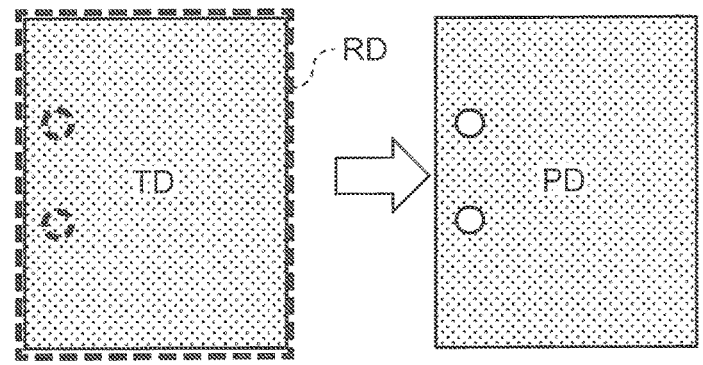
FIG. 4A is an explanatory diagram for processing to be executed by the generation processing part to generate a print image.
Figure 4B:
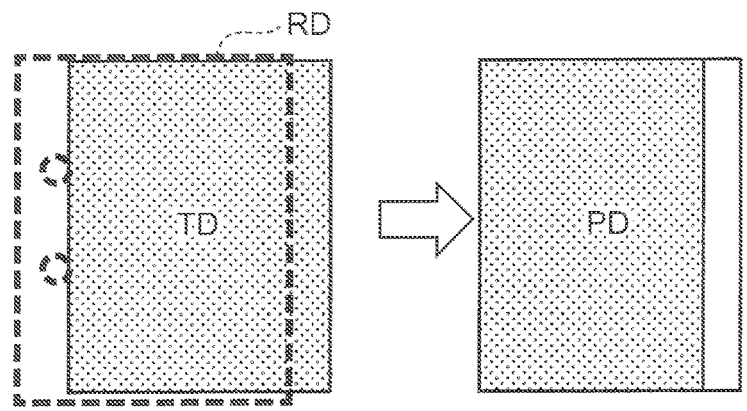
FIG. 4B is an explanatory diagram for the processing to be executed by the generation processing part to generate the print image.
Figure 4C:
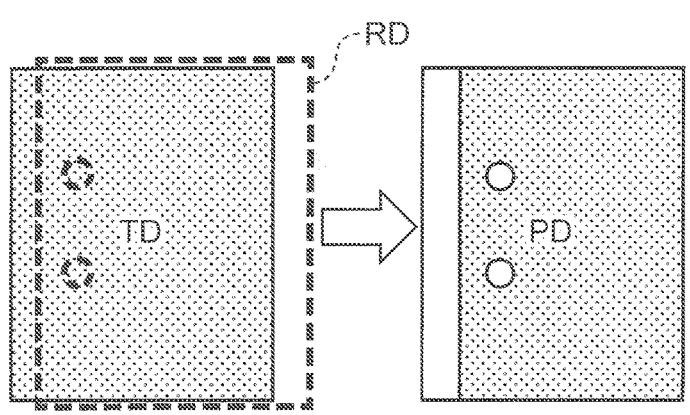
FIG. 4C is an explanatory diagram for the processing to be executed by the generation processing part to generate the print image.

Next, details of each of the generation processing part 41, the printing processing part 42 and the adjustment processing part 43 will be described. In the following description, the terms "leftward (leftward direction)" and "rightward (rightward direction)" mean, respectively, leftward (leftward direction) and rightward (rightward direction) in FIG. 3. FIGS. 4A, 4B and 4C are explanatory diagrams for processing of generating a print image PD, which is to be executed by the generation processing part 41.

The generation processing part 41 is operable, based on the setup value MG0 (which is not indicated in the figures) of the relative distance MG preliminarily stored in the storage unit 70, to superimpose an outline image RD imaged by the imaging unit 14 on a target image TD to be formed on the sheet P, such that a left edge of the target image TD becomes coincident with a left edge of the outline image RD, as depicted in FIG. 4A. Then, the generation processing part 41 is operable to generate a print image PD in which a region of the target image TD uncovered by the outline image RD is changed to a margin region.

Specifically, as depicted in FIG. 3, an imaging range of the imaging unit 14 in the width direction X deviates rightwardly from the range of image formation by the printing unit 21 in the width direction X, by the relative distance MG. Thus, the generation processing part 41 is operable to move the outline image RD input from the imaging unit 14 into the control unit 40, in the leftward direction by the setup value MG0 of the relative distance MG stored in the storage section 70, and then superimpose the moved outline image RD on the target image TD. That is, the generation processing part 41 is operable to superimpose the outline image RD on the target image TD, such that the left edge of the target image TD becomes coincident with the left edge of the outline image RD, as depicted in FIG. 4A, and then generates the print image PD.

However, there is a possibility that the imaging unit 14 is disposed at a position deviating rightwardly from its preset disposed position, due to a design tolerance, an assembly tolerance, and the like. That is, there is a possibility that an actual value of the relative distance MG representing the relative position of the imaging unit 14 with respect to the printing unit 21 becomes greater than the setup value MG0 of the relative desistance MG by stored in the storage section 70.

In this situation, the imaging unit 14 is operable to determine that the outline of the sheet P lies on a more leftward side as compared to the case where the imaging unit 14 is properly disposed at its preset disposed position, and then output the outline image RD which deviates leftwardly. Thus, the generation processing part 41 is operable to generate the print image PD by moving the leftwardly-deviating outline image RD leftwardly by the setup value MG0 of the relative distance MG stored in the storage unit 70 in the above manner and then superimposing the moved outline image RD on the target image TD, as depicted in FIG. 4B. As a result, the print image PD is generated by modifying the target image TD such that a region thereof having a given length measured leftwardly from a rightward lateral edge (hereinafter referred to as "right edge") thereof is changed to a margin region.

On the other hand, there is also a possibility that the imaging unit 14 is disposed at a position deviating leftwardly from its preset disposed position, due to a design tolerance, an assembly tolerance, and the like. That is, there is a possibility that an actual value of the relative distance MG representing the relative position of the imaging unit 14 with respect to the printing unit 21 becomes less than the setup value MG0 of the relative desistance MG stored in the storage section 70.

In this situation, the imaging unit 14 is operable to determine that the outline of the sheet P lies on a more rightward side as compared to the case where the imaging unit 14 is properly disposed at its preset disposed position, and then output the outline image RD which deviates rightwardly. Thus, the generation processing part 41 is operable to generate the print image PD by moving the rightwardly-deviating outline image RD leftwardly by the setup value MG0 of the relative distance MG stored in the storage unit 70 in the above manner and then superimposing the moved outline image RD on the target image TD, as depicted in FIG. 4C. As a result, the print image PD is generated by modifying the target image TD such that a region thereof having a given length measured rightwardly from the left edge thereof is changed to a margin region.

FIGS. 5A, 5B and 5C are explanatory diagrams for processing to be executed by the printing processing part 42 to form the print image PD on a sheet P, in a state in which the width (X)-directional center of the print image PD (the center of the print image PD in the width direction X) is coincident with the width (X)-directional center of the sheet P. The printing processing part 42 is operable, based on the setup value MG0 of the relative distance MG preliminarily stored in the storage unit 70, to execute printing processing of causing the printing unit 21 to form the print image PD on the sheet P such that the width (X)-directional center of the print image PD becomes coincident with the width (X)-directional center of the sheet P, as depicted in FIG. 5A.

Specifically, the printing processing part 42 is operable to calculate a sheet-center distance CP which is a distance from a left edge of the range of image formation by the printing unit 21 in the width direction X to the widthwise (X)-directional center of the outline image RD (the center of the outline image RD in the width direction X), as presented in FIG. 3, by the following formula (1).

$$CP=ST+(ED-ST)/2+MG0 \qquad (1)$$

In the formula (1), ST denotes a left edge distance which is a spaced-apart distance between a left edge of the imaging range of the imaging unit 14 in the width direction X and the left edge of the outline of the sheet P represented by the outline image RD (hereinafter referred to as "left edge distance ST"). Further, ED denotes a right edge distance which is a spaced-apart distance between the left edge of the imaging range of the imaging unit 14 in the width direction X and the right edge of the outline of the sheet P represented by the outline image RD (hereinafter referred to as "right edge distance ED"). MG0 denotes the setup value MG0 of the relative distance MG stored in the storage unit 70.

When a result obtained by subtracting the calculated sheet-center distance CP from the setup value of the center distance CH preliminarily stored in the storage unit 70 indicates a positive value, the printing processing part 42 is operable to determine that the width (X)-directional center of the sheet P lies leftward of the width (X)-directional center of the printing unit 21. Then, the printing processing part 42 is operable to form the print image PD on the sheet P, in a state in which an ink-drop jetting position corresponding to the print image PD is shifted leftwardly by a distance according to the subtraction result.

On the other hand, when the result obtained by subtracting the calculated sheet-center distance CP from the setup value of the center distance CH preliminarily stored in the storage unit 70 indicates a negative value, the printing processing part 42 is operable to determine that the width (X)-directional center of the sheet P lies rightward of the width (X)-directional center of the printing unit 21. Then, the printing processing part 42 is operable to form the print image PD on the sheet P, in a state in which the ink-drop jetting position corresponding to the print image PD is shifted rightwardly by a distance according to the absolute value of the subtraction result.

After the above operations, the printing processing part 42 is operable to execute the printing processing of causing the printing unit 21 to form the print image PD on the sheet P, such that the width (X)-directional center of the print image PD becomes coincident with the width (X)-directional center of the sheet P, as depicted in FIG. 5A.

However, there is a possibility that the printing unit 21 is disposed at a position deviating leftwardly from its preset disposed position, due to a design tolerance, an assembly tolerance, and the like. That is, there is a possibility that an actual value of the relative distance MG representing the relative position of the imaging unit 14 with respect to the printing unit 21 becomes greater than the setup value MG0 of the relative desistance MG stored in the storage section 70.

In this situation, the printing processing part 42 is operable, using the setup value MG0 of the relative value MG and the setup value of the center distance CH each stored in the storage unit 70, to determine how much the width (X)-directional center of the sheet P deviates from the width (X)-directional center of the printing unit 21 which lies on a more rightward side than an actual width (X)-directional center of the printing unit 21, in the same manner as described above. Thus, for example, even if the width (X)-directional center of the sheet P largely deviates rightwardly from the actual width (X)-directional center of of the printing unit 21, the printing processing part 42 is operable to determine that the width (X)-directional center of the sheet P slightly deviates rightwardly.

In this situation, despite a need to largely shift the position of image formation by the printing unit 21 rightwardly so as to enable the width (X)-directional center of the print image PD to become coincident with the width (X)-directional center of the sheet P, the printing processing part 42 is actually operable to slightly shift the position rightwardly. As a result, the print image PD is formed on the sheet P, such that the width (X)-directional center of the print image PD lies at a position deviating leftwardly with respect to the width (X)-directional center of the sheet P, as depicted in FIG. 5B.

On the other hand, there is also a possibility that the printing unit 21 is disposed at a position deviating rightwardly from its preset disposed position, due to a design tolerance, an assembly tolerance, and the like. That is, there is a possibility that an actual value of the relative distance MG representing the relative position of the imaging unit 14 with respect to the printing unit 21 becomes less than the setup value MG0 of the relative desistance MG stored in the storage section 70.

In this situation, the printing processing part 42 is operable, using the setup value MG0 of the relative value MG and the setup value of the center distance CH each stored in the storage unit 70, to determine how much the width (X)-directional center of the sheet P deviates from the width (X)-directional center of the printing unit 21 which lies on a more leftward side than an actual width (X)-directional center of the printing unit 21, in the same manner as described above. Thus, for example, even if the width (X)-directional center of the sheet P largely deviates leftwardly from the actual width (X)-directional center of of the printing unit 21, the printing processing part 42 is operable to determine that the width (X)-directional center of the sheet P slightly deviates leftwardly.

In this situation, despite a need to largely shift the position of image formation by the printing unit 21 leftwardly so as to enable the width (X)-directional center of the print image PD to become coincident with the width (X)-directional center of the sheet P, the printing processing part 42 is actually operable to slightly shift the position leftwardly. As a result, the print image PD is formed on the sheet P, such that the width (X)-directional center of the print image PD lies at a position deviating rightwardly with respect to the width (X)-directional center of the sheet P, as depicted in FIG. 5C.

At a printing start time immediately after a time period represented by the setup value of the conveyance time period TT preliminarily stored in the storage unit 70 has elapsed from a time when the detection unit 16 detected reaching of the leading edge of the sheet P, the generation processing part 41 is operable to superimpose the outline image RD on the target image TD step-by-step in increments of given lines (e.g., 3 lines) extending in the width direction X to sequentially generate a plurality of segments of the print image PD each for the given lines, in the same manner as described above. For example, the given lines are preliminarily set in conformity to the length of the region of image formation by the printing unit 21 in the conveyance direction Y, and preliminarily stored in the storage unit 70 or the like.

Figure 6A:
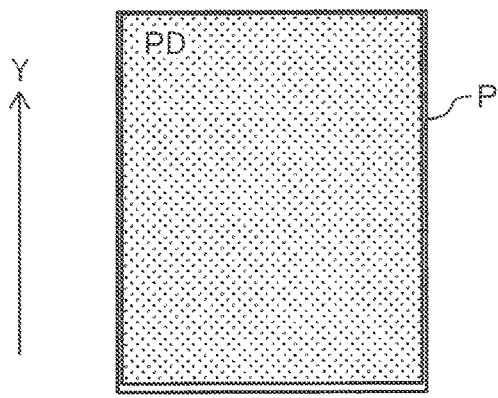
FIG. 6A is an explanatory diagram for processing of forming the print image on a sheet, in a state in which a leading edge of the print image is coincident with a leading edge of the sheet.
Figure 6B:
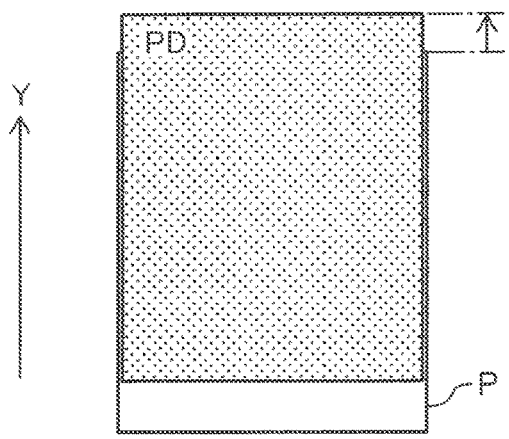
FIG. 6B is an explanatory diagram for the processing of forming the print image on a sheet, in the state in which the leading edge of the print image is coincident with the leading edge of the sheet.
Figure 6C:
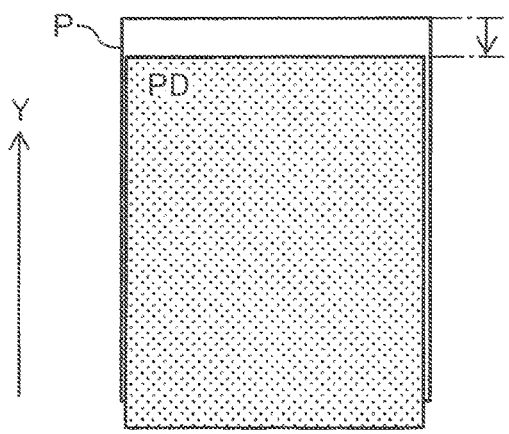
FIG. 6C is an explanatory diagram for the processing of forming the print image on a sheet, in the state in which the leading edge of the print image is coincident with the leading edge of the sheet.

FIGS. 6A, 6B and 6C are explanatory diagrams for processing of forming the print image PD on a sheet P, in a state in which a leading edge of the print image PD is coincident with the leading edge of the sheet P. Upon start of generation of the print image PD by the generation processing part 41, the printing processing part 42 starts the printing processing. In the printing processing, the printing processing part 42 is operable to cause the printing unit 21 to sequentially form, on the sheet P, the plurality of segments of the print image PD each generated by the generation processing part 41 for the given lines, in the above manner. In this way, the generation processing part 41 and the printing processing part 42 can form the print image PD on the sheet P, in the state in which the leading edge of the print image PD is coincident with the leading edge of the sheet P, as depicted in FIG. 6A.

However, there is a possibility that the printing unit 21 is disposed at a position downstream of its preset disposed position in the conveyance direction Y, due to a design tolerance, an assembly tolerance, and the like. That is, there is a possibility that an actual value of the spaced-apart distance LH (FIG. 1) between the detection unit 16 and the printing unit 21 in the conveyance direction Y becomes greater than the setup value of the spaced-apart distance LH stored in the storage section 70. In another respect, there is a possibility that an actual value of the conveyance time period TT necessary for conveying the sheet P by the spaced-apart distance LH from the detection section 16 to the printing unit 21 becomes greater than the setup value of the conveyance time period TT stored in the storage unit 70.

In this situation, at a time immediately after the time period represented by the setup value of the conveyance time period TT preliminarily stored in the storage unit 70 has elapsed from the time when the detection unit 16 detected reaching of the leading edge of the sheet P, the generation processing part 41 is operable to determine that the printing start time has come, and start the formation of the print image PD, even though the leading edge of the sheet P has not reached the printing unit 21. Thus, the printing unit 42 is operable to start the printing processing at the printing start time to form the print image PD on the sheet P as the plurality of segments of the print image PD sequentially generated by the generation processing part 41 in increments of the given lines. As a result, a leading edge region of the print image PD is not formed on the sheet P, as depicted in FIG. 6B.

On the other hand, there is a possibility that the printing unit 21 is disposed at a position upstream of its preset disposed position in the conveyance direction Y, due to a design tolerance, an assembly tolerance, and the like. That is, there is a possibility that an actual value of the spaced-apart distance LH (FIG. 1) between the detection unit 16 and the printing unit 21 in the conveyance direction Y becomes less than the setup value of the spaced-apart distance LH stored in the storage section 70. Along with this, there is a possibility that an actual value of the conveyance time period TT necessary for conveying the sheet P by the spaced-apart distance LH from the detection section 16 to the printing unit 21 becomes less than the setup value of the conveyance time period TT stored in the storage unit 70.

In this situation, at the time immediately after the time period represented by the setup value of the conveyance time period TT preliminarily stored in the storage unit 70 has elapsed from the time when the detection unit 16 detected reaching of the leading edge of the sheet P, the generation processing part 41 is operable to determine that the printing start time has come, and starts the formation of the print image PD, even though the leading edge of the sheet P has already passed through the printing unit 21. Thus, the printing unit 42 is operable to start the printing processing at the printing start time to form, on the sheet P, the plurality of segments of the print image PD sequentially generated by the generation processing part 41 in increments of the given lines. As a result, the sheet P has a margin region in a leading edge region thereof, as depicted in FIG. 6C.

The adjustment processing part 43 is operable to perform adjustment processing for solving the problem that the print image PD is formed in an improper position of the sheet P due to the situation where the imaging unit 14 or the printing unit 21 is disposed at a position different from its preset disposed position, as mentioned above with reference to FIGS. 4B, 4C, 5B, 5C, 6B and 6C.

The adjustment processing means processing of performing the aftermentioned test processing, and, based on the sheet P formed with the resulting print image PD, causing a user to adjust the respective setup values of the relative distance MG, the spaced-apart distance LH between the detection unit 16 and the printing unit 21 in the conveyance direction Y, and the conveyance time period TT necessary for conveying the sheet P by the spaced-apart distance LH from the detection section 16 to the printing unit 21, each preliminarily stored in the storage unit 70.

Figure 7:
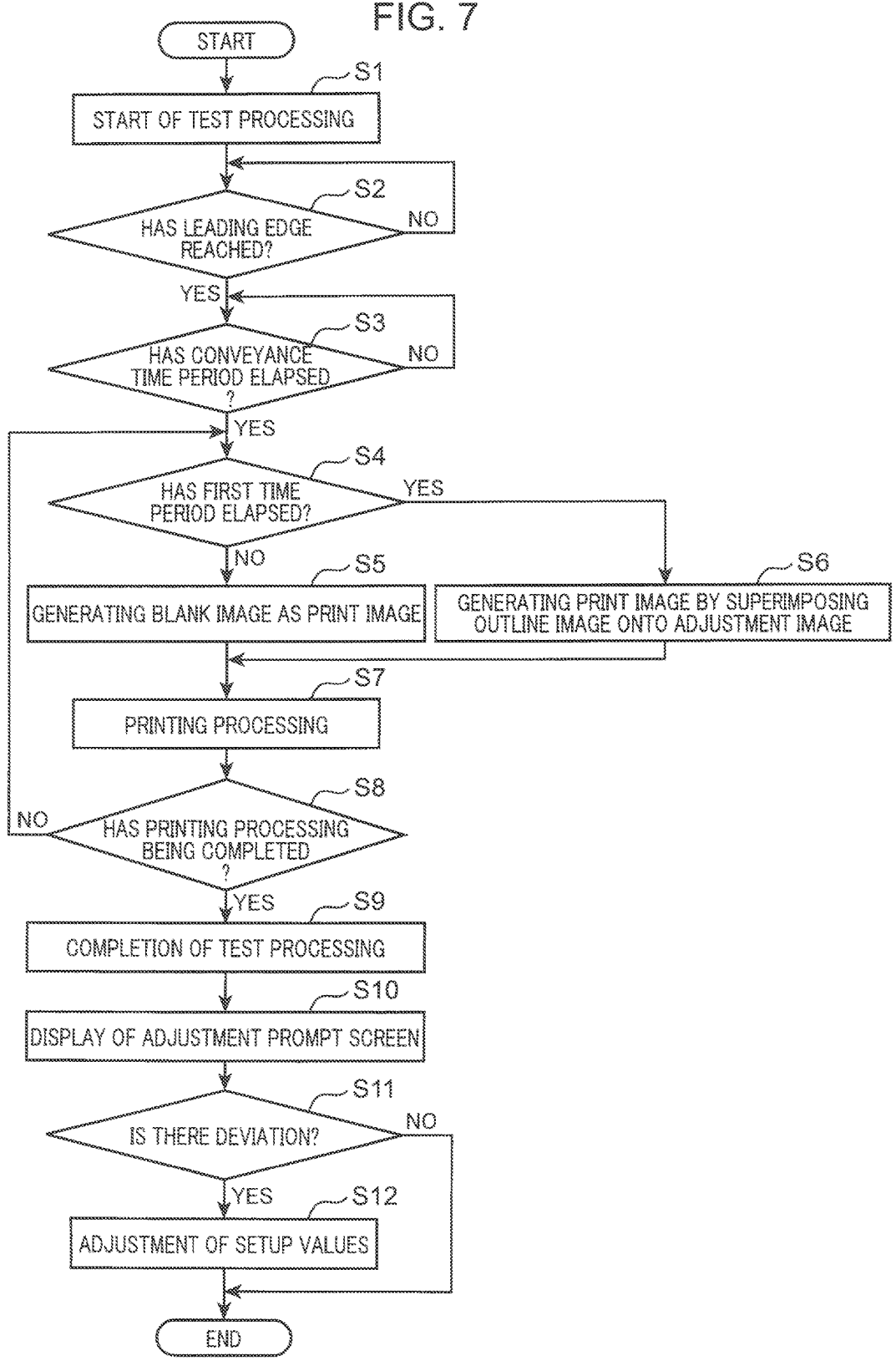
FIG. 7 is a flowchart presenting a flow of adjustment processing.

FIG. 7 is a flowchart presenting a flow of the adjustment processing. Upon input of an instruction signal for starting the adjustment processing, from the manipulation unit 50 or the communication unit 60 into the control unit 40, the adjustment processing part 43 starts the adjustment processing. As depicted in FIG. 7, upon start of the adjustment processing, the adjustment processing part 43 first starts test processing (step S1).

Specifically, in the step S1, the adjustment processing part 43 operates to acquire a first adjustment image D1 (adjustment image) preliminarily stored in the storage unit 70, and starts conveyance of one sheet P.

Figure 8:
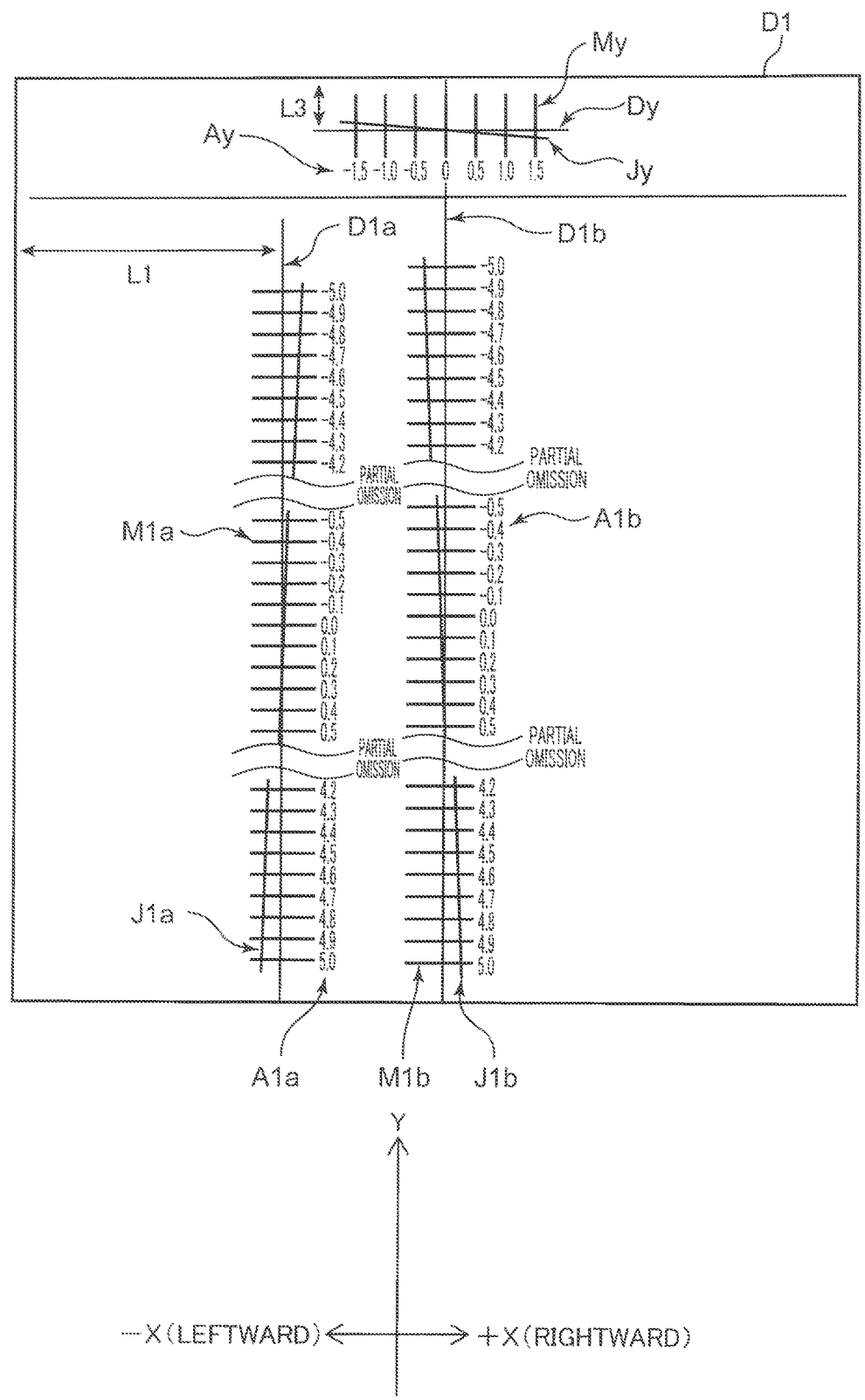
FIG. 8 is a diagram depicting one example of a first adjustment image.

FIG. 8 is a diagram depicting one example of the first adjustment image D1. As depicted in FIG. 8, the first adjustment image D1 includes: an offset image D1*a* indicating a straight line which extends in the conveyance direction Y and represents a position spaced apart from a left edge thereof in the width direction X by a first distance L1; a center image D1*b* indicating a straight line which extends in the conveyance direction Y and represents the width (X)-directional center thereof; and a leading edge image Dy indicating a straight line which extends in the width direction X and represents a position spaced apart from a leading edge thereof in a direction opposite to the conveyance direction Y by a third distance L3. Here, the first distance L1 and the third distance L3 are preliminarily stored in the storage unit 70 or the like. The third distance L3 is set to a distance over which the sheet P is conveyed in a given first time period T1 (not indicated in the figures).

Further, the first adjustment image D1 includes: an offset scale image M1*a* indicating a plurality of straight lines orthogonal to the straight line indicated by the offset image D1*a*; and an offset determination image J1*a* indicating a straight line which intersects the straight line indicated by the offset image D1*a* and the plurality of straight lines indicated by the offset scale image M1*a*. Further, the first adjustment image D1 includes an offset adjustment value image A1*a* indicating adjustment values associated, respectively, with the plurality of straight lines indicated by the offset scale image M1*a*.

Further, the first adjustment image D1 includes: a center scale image M1*b* indicating a plurality of straight lines orthogonal to the straight line indicated by the center image D1*b*; and a center determination image J1*b* indicating a straight line which intersects the straight line indicated by the center image D1*b* and the plurality of straight line indicated by the center scale image M1*b*. Further, the first adjustment image D1 includes a center adjustment value image A1*b* indicating adjustment values associated, respectively, with the plurality of straight lines indicated by the center scale image M1*b*.

Further, the first adjustment image D1 includes: a leading edge scale image My indicating a plurality of straight lines orthogonal to the straight line indicated by the leading edge image Dy; and a leading edge determination image Jy indicating a straight line which intersects the straight line indicated by the leading edge image Dy and the plurality of straight line indicated by the leading edge scale image My. Further, the first adjustment image D1 includes a leading edge adjustment value image Ay indicating adjustment values associated, respectively, with the plurality of straight lines indicated by the leading edge scale image My.

Refer to FIG. 7 again. After the step S1, the adjustment processing part 43 is kept in a standby state until the detection unit 16 detects reaching of the leading edge of the sheet P (step S2: NO). Upon detection of reaching of the leading edge of the sheet P by the detection unit 16 detects (step S2: YES), the adjustment processing part 43 operates to monitor whether a time period represented by the setup value of the conveyance time period TT stored in the storage unit 70 has elapsed after the detection (step S3: NO).

At a printing start time immediately after the elapse of a time period represented by the setup value of the conveyance time period TT (step S3: YES), the adjustment processing part 43 operates to determine that the leading edge of the sheet P has reached the printing unit 21, and start processing of causing the generation processing part 41 to generate the print image PD. However, in the test processing, in a period from the printing start time through until the given first time period T1 elapses (step S4: NO), the adjustment processing part 43 operates to cause the generation processing part 41 to sequentially generate images each serving as one segment of the print image PD for given lines, by modifying the first adjustment image D1 such that a region thereof corresponding to the given lines is converted to a margin region, without superimposing the outline image RD on the first adjustment image D1 (step S5).

On the other hand, when the first time period T1 has elapsed from the printing start time (step S4: YES), the adjustment processing part 43 operates to cause the generation processing part 41 to superimpose the outline image RD on the first adjustment image D1 in increments of the given lines extending in the width direction X to sequentially generate a plurality of segments of the print image PD each for the given lines (step S6). More specifically, in the step S6, the adjustment processing part 43 operates to cause the generation processing part 41 to superimpose the outline image RD on the first adjustment image D1 such that the left edge of the first adjustment image D1 becomes coincident with the left edge of the outline image RD, based on the setup value MG0 of the relative distance MG preliminarily stored in the storage unit 70. Subsequently, the adjustment processing part 43 operates to cause the generation processing part 41 to further shift the outline image RD rightwardly by the first distance L1 and then generate the print image PD.

Upon start of generation of the print image PD by the processing part 41 in the step S5 and the step S6, the adjustment processing part 43 operates to cause the printing processing part 42 to start the printing processing (step S7). In the printing processing in the step S7, the printing processing part 42 operates to cause the printing unit 21 to sequentially form, on the sheet P, the plurality of segments of the print image PD generated by the generation processing part 41 in increments of the given lines. When the last segment of the print image PD for the given lines is formed on the sheet P by the printing unit 21, the printing processing part 42 terminates the printing processing.

The adjustment processing part 43 will operate to repeat the processing in the step S4 and the subsequent steps, until the printing processing is completed (step S8: NO). Upon completion of the printing processing (step S8: YES), the adjustment processing part 43 terminates the test processing (step S9).

Upon completion of the test processing, the adjustment processing part 43 operates to display an adjustment prompt screen (not depicted) on a display panel provided in the manipulation unit 50, based on the sheet P formed with the print image PD through the printing processing (step S10). The adjustment prompt screen is a manipulation screen for prompting and allowing a user to adjust respective setup values of the relative distance MG, the spaced-apart distance LH and the conveyance time period TT preliminarily stored in the storage unit 70.

For example, the adjustment prompt screen includes a message for prompting a user to adjust respective setup values of the relative distance MG, the spaced-apart distance LH and the conveyance time period TT preliminarily stored in the storage unit 70, and edit fields for the setup values. When displaying the adjustment prompt screen, the adjustment processing part 43 operates to enter the setup values preliminarily stored in the storage unit 70, respectively, to the edit fields for the setup values. Then, in the edit fields, each of the setup values entered therein are edited by manipulation of the user. The adjustment processing part 43 operates to update the setup values preliminarily stored in the storage unit 70 with corresponding setup values edited on the edit fields.

FIGS. 9A, 9B and 9C are explanatory diagrams for test processing to be performed using the first adjustment image D1. Assume that the test processing is performed when the detection unit 16 and the printing unit 21 are located, respectively, at their preset disposed positions in the conveyance direction Y of the sheet P, and thereby the spaced-apart distance LH and the conveyance time period TT each stored in the storage unit 70 are correct. In this situation, the leading edge of the sheet P reaches the printing unit 21 at the printing start time, and the sheet P is conveyed by the third distance L3 in a period from the printing start time through until the first time period T1 elapses.

As a result of performing the step S5 during the above period, a region of the first adjustment image D1 from the leading edge of the first adjustment image D1 to a position spaced apart from the leading edge in the direction opposite to the conveyance direction Y by the third distance L3 is changed to a margin region in increments of the given lines, as depicted in FIG. 9A. It should be noted here that the outline image RD depicted in FIG. 9A is slightly shifted from its proper position, for the sake of explanation.

Therefore, as a result of performing the step S7, a margin region having a conveyance (Y)-directional length (a length in the conveyance direction Y) equal to the third distance L3 lies along the leading edge of the sheet P, and the leading edge image Dy is formed at a position spaced apart from the leading edge of the sheet P in the direction opposite to the conveyance direction Y by the third distance L3, as depicted in FIG. 9B. That is, a difference between the third distance L3 and the conveyance (Y)-directional length LT of the margin region lying along the leading edge of the sheet P becomes 0.

Subsequently, in the step S6, the left edge of the first adjustment image D1 and the left edge of the outline image RD are brought into coincidence with each other, based on the setup value MG0 of the relative distance MG preliminarily stored in the storage unit 70, and further the outline image RD is shifted rightwardly by the first distance L1 and superimposed on the first adjustment image D1. Then, the print image PD is generated in a state in which a region of the first adjustment image D1 uncovered by the outline image RD in the superimposed state is changed to a margin region, as depicted in FIG. 9A.

Therefore, in the step S7, a margin region having a width (X)-directional length (a length in the width direction X) equal to the first distance L1 is formed along the left edge of the sheet P, and the center image D1b and the offset image D1a are formed, respectively, at the width (X)-directional center of the sheet P, and a position spaced apart rightwardly from the left edge of the sheet P by the first distance L1, as depicted in FIG. 9B. That is, a difference between the first distance L1 and the width (X)-directional length of the margin region lying along the left edge of the sheet P becomes 0. Further, a spaced-apart distance between the width (X)-directional center of the sheet P and the width (X)-directional center of the first adjustment image D1 indicated by the center image D1b formed on the sheet P becomes 0.

As a different situation, assume that the test processing is performed in the situation where the imaging unit 14 is disposed at a position different from its preset disposed position, as mentioned above with reference to FIGS. 4B and 4C. In this situation, in the step S6, the outline image RD is superimposed on the first adjustment image D1, based on the incorrect setup value MG0 of the relative distance MG preliminarily stored in the storage unit 70. Thus, the print image PD is formed in a state in which a region of the first adjustment image D1 between the left edge of the first adjustment image D1 and a position spaced apart rightwardly from the left edge by a distance different from the first distance L1 is changed to a margin region. Then, the printing processing in the step S7 is performed. As a result, a margin region having a width (X)-directional length different from the first distance L1 lies along the left edge of the sheet P, as depicted, for example, in FIG. 9C, so that a difference ds between the first distance L1 and the width (X)-directional length LS of this margin region becomes non-0.

Further, assume that the test processing is performed in the situation where the printing unit 21 is located at a position different from its preset disposed position, and thereby the setup value MG0 of the relative distance MG preliminarily stored in the storage unit 70 is incorrect, as mentioned above with reference to FIGS. 5B and 5C. In this situation, in the printing processing in the step S7, the print image PD is formed on the sheet P such that the width (X)-directional center of the print image PD become coincident with the width (X)-directional center of the sheet P, based on the incorrect setup value MG0 of the relative distance MG. As a result, a spaced-apart distance dc between the width (X)-directional center of the sheet P and the width (X)-directional center of the first adjustment image D1 indicated by the center image D1b formed on the sheet P becomes non-0, as depicted, for example, in FIG. 9C.

Further, assume that the detection unit 16 or the printing unit 21 is located at a position different from its preset disposed position in the conveyance direction of the sheet P, and thereby the conveyance time period TT stored in the storage unit 70 is incorrect, as mentioned above with reference to FIGS. 6B and 6C. As a result of performing the test processing in this situation, at the printing start time, the position of the leading edge of the sheet P is located at a position different from the position of the printing unit 21. Thus, when the sheet P is conveyed by the third distance L3 in the period from the printing start time through until the first time period T1 elapses, a position spaced apart from the leading edge of the sheet P in the direction opposite to the conveyance direction Y by the third distance L3 is located at a position different from the position of the printing unit 21.

Therefore, in the steps S5 and S7, a region of the first adjustment image D1 from the leading edge of the first adjustment image D1 to a position spaced apart from the leading edge in the direction opposite to the conveyance direction Y by a distance different from the third distance L3 is converted to a margin region in increments of the given lines, as depicted, for example, in FIG. 9C. As a result, a margin region having a conveyance (Y)-directional length different from the third distance L3 lies along the leading edge of the sheet P. That is, a difference dt between the third distance L3 and the conveyance (Y)-directional length LT of the margin region lying along the leading edge of the sheet P becomes non-0.

When the adjustment prompt screen is displayed on the display panel in the step S10, a user determines whether or not each of the difference ds between the first distance L1 and the width (X)-directional length LS of the margin region lying along the left edge of the sheet P, the spaced-apart distance dc between the width (X)-directional center of the sheet P and the width (X)-directional center of the first adjustment image D1 indicated by the center image D1b formed on the sheet P, and the difference dt between the third distance L3 and the conveyance (Y)-directional length LT of the margin region lying along the leading edge of the sheet P is 0.

When all of the difference ds, the spaced-apart distance dc and the difference dt are 0, the user determines that there is no deviation in the image formation position with respect to the sheet P, and inputs an instruction for terminating the adjustment processing, using the manipulation unit 50 (step S11; NO). In this case, the adjustment processing part 43 terminates the adjustment processing. On the other hand, when the user determines that at least one of the difference ds, the spaced-apart distance dc and the difference dt is not 0, the user determines that there is a deviation in the image formation position with respect to the sheet P (step S11: YES). In this case, the user adjusts respective setup values of the relative distance MG, the spaced-apart distance LH and the conveyance time period TT each stored in the storage unit 70, such that each of the difference ds, the spaced-apart distance dc and the difference dt becomes 0, using the manipulation unit 50 (step S12).

Details of an adjustment method for the setup values in the steps S11 and S12 will be described below. First of all, an adjustment method for the setup value of the relative distance MG stored in the storage unit 70, based on the difference ds between the first distance L1 and the width (X)-directional length LS of the margin region lying along the left edge of the sheet P after being subjected to the test processing will be described.

<Adjustment Method Based on Difference ds>

Figure 10A:
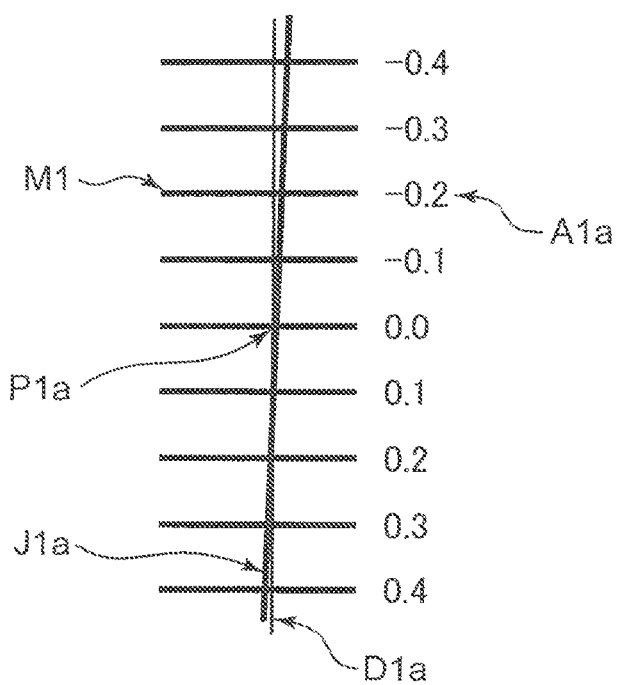
FIG. 10A is an explanatory diagram for an adjustment method based on a difference between the first distance and the width-directional length of a margin region lying along a left edge of a sheet after being subjected to the test processing.
Figure 10B:
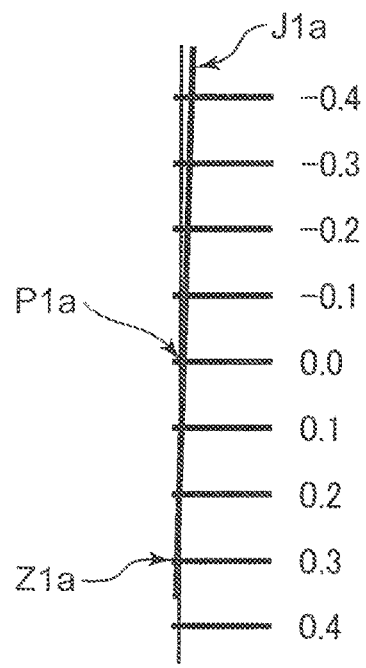
FIG. 10B is an explanatory diagram for the adjustment method based on a difference between the first distance and the width-directional length of the margin region lying along a left edge of a sheet after being subjected to the test processing.

FIGS. 10A and 10B are explanatory diagrams for the adjustment method based on the difference ds between the first distance L1 and the width (X)-directional length LS of the margin region lying along the left edge of a sheet P after being subjected to the test processing. As depicted in FIGS. 8 and 10A, the straight line indicated by the offset image D1a, the straight line indicated by the offset determination image J1a, and one straight line associated with the adjustment value "0.0" indicated by the offset adjustment value image Ala, among the plurality of straight lines comprised in the offset scale image M1a, are disposed to intersect each other at a first reference point P1a. That is, in a case where a margin region having a width (X)-directional length equal to the first distance L1 is formed along the left edge of the sheet P after being subjected to the test processing, and the difference ds between the first distance L1 and the width (X)-directional length LS of this margin region is 0, the above three straight lines are arranged such that a right edge of the margin region is located on the first reference point P1a.

In a case where the right edge of the margin region lying along the left edge of the sheet P after being subjected to the test processing intersects an intersection point between one straight line associated with one of the adjustment values indicated by the offset adjustment value image Ala, among the plurality of straight lines indicated by the offset scale image M1a, and the straight line indicated by the offset determination image J1a, the adjustment value designates a value for adjusting the relative distance MG so as to enable the difference ds between the first distance L1 and the width (X)-directional length of the margin region to become 0.

Therefore, when the right edge of the margin region lying along the left edge of the sheet P after being subjected to the test processing is located on the first reference point P1a, the user determines, in the step S11, that the difference ds is 0.

As a different situation, assume that the test processing is performed, for example, in the situation where the imaging unit 14 is disposed with a rightward deviation with respect to its preset disposed position, and thereby an actual value of the relative distance MG becomes greater than the setup value MG0 of the relative distance MG stored in the storage unit 70, as mentioned above with reference to FIG. 4B. In this situation, the outline image RD taken with a leftward deviation is superimposed on the first adjustment image D1 to generate the print image PD in the step S6, and the generated print image PD is formed on the sheet P in the step S7. Thus, a margin region having a width (X)-directional length less than the first distance L1 lies along the left edge of the sheet P after being subjected to the test processing. As a result, as depicted, for example, in FIG. 10B, a right edge of the margin region intersects an intersection point Z1a between one straight line lying on the side of a trailing edge of the first adjustment image D1 with respect to the straight line including the first reference point P1a, among the plurality of straight lines indicated by the offset scale image M1a, and the straight line indicated by the offset determination image J1a.

In this case, the right edge of the margin region is not located on the first reference point P1a. Thus, in the step S11, the user determines that the difference ds is not 0. Then, in the step S12, through the use of the edit field for the setup value MG0 of the relative distance MG stored in the storage unit 70, the user adds the adjustment value associated with the straight line including the intersection point Z1a, to the setup value MG0 entered in the edit field.

Here, among the plurality of straight lines indicated by the offset scale image M1a, a straight line lying close to the trailing edge of the first adjustment image D1 with respect to the straight line including the first reference point P1a is associated with a positive adjustment value which becomes larger toward the trailing edge of the first adjustment image D1. Specifically, even in a situation where the imaging unit 14 is disposed with a large rightward deviation with respect to its preset disposed position, and thereby an actual value of the relative distance MG becomes significantly greater than the setup value MG0 of the relative distance MG stored in the storage unit 70, the adjustment values can be set to enable the adjustment to be adequately performed such that the setup value MG0 is more largely increased as the right edge of the margin region more largely deviates leftwardly with respect to the first reference point P1a.

Further, assume that the test processing is performed, for example, in the situation where the imaging unit 14 is disposed with a leftward deviation with respect to its preset disposed position, and thereby an actual value of the relative distance MG becomes less than the setup value MG0 of the relative distance MG stored in the storage unit 70, as mentioned above with reference to FIG. 4C. In this situation, the outline image RD taken with a rightward deviation is superimposed on the first adjustment image D1 to generate the print image PD in the step S6, and the generated print image PD is formed on the sheet P in the step S7. Thus, a margin region having a width (X)-directional length greater than the first distance L1 lies along the left edge of the sheet P after being subjected to the test processing. As a result, a right edge of the margin region intersects an intersection point between one straight line (e.g., a straight line associated with the adjustment value "− 0.3" presented in FIG. 10B) lying on the side of the leading edge of the first adjustment image D1 with respect to the straight line including the first reference point P1a, among the plurality of straight lines indicated by the offset scale image M1a, and the straight line indicated by the offset determination image J1a.

In this case, the right edge of the margin region is not located on the first reference point P1a. Thus, in the step S11, the user determines that the difference ds is not 0. Then, in the step S12, through the use of the edit field for the setup value MG0 of the relative distance MG stored in the storage unit 70, the user adds the adjustment value (e.g., −0.3) associated with the straight line including the above intersection point, to the setup value MG0 entered in the edit field.

Here, among the plurality of straight lines indicated by the offset scale image M1a, a straight line lying close to the leading edge of the first adjustment image D1 with respect to the straight line including the first reference point P1a is associated with a negative adjustment value whose absolute value becomes larger toward the leading edge of the first adjustment image D1. Specifically, even in a situation where the imaging unit 14 is disposed with a large leftward deviation with respect to its preset disposed position, and thereby an actual value of the relative distance MG becomes significantly less than the setup value MG0 of the relative distance MG stored in the storage unit 70, the adjustment values can be set to enable the adjustment to be performed such that the setup value MG0 of the relative distance MG is more largely reduced as the right edge of the margin region more largely deviates rightwardly with respect to the first reference point P1a.

<Adjustment Method Based on Spaced-Apart Distance dc>

The following description will be made about an adjustment method for the setup value of the relative distance MG stored in the storage unit 70, based on the spaced-apart distance dc between the width (X)-directional center of the sheet P and the width (X)-directional center of the first adjustment image D1 indicated by the center image D1b formed on the sheet P after being subjected to the test processing.

Figure 11A:
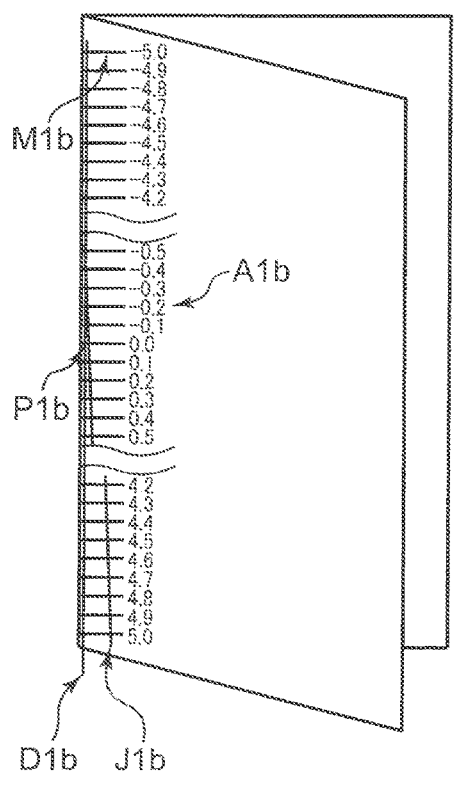
FIG. 11A is an explanatory diagram for an adjustment method based on a spaced-apart distance between the width-directional center of a sheet and the width-directional center of the first adjustment image represented by a central image formed on the sheet after being subjected to the test processing.
Figure 11B:
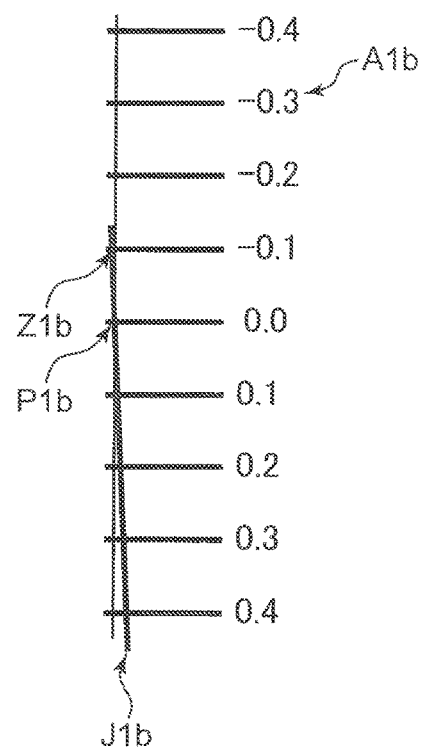
FIG. 11B is an explanatory diagram for the adjustment method based on the spaced-apart distance between the width-directional center of a sheet and the width-directional center of the first adjustment image represented by the central image formed on the sheet after being subjected to the test processing.

FIGS. 11A and 11B are explanatory diagram for the adjustment method based on the spaced-apart distance dc between the width (X)-directional center of a sheet P and the width (X)-directional center of the first adjustment image D1 represented by a central image D1b formed on the sheet P after being subjected to the test processing. As depicted in FIGS. 8 and 11A, the straight line indicated by the center image D1b, the straight line indicated by the center determination image J1b, and one straight line associated with the adjustment value "0.0" indicated by the center adjustment value image A1b, among the plurality of straight lines indicated by the center scale image M1b, are disposed to intersect each other at a center reference point P1b. That is, in a case where the spaced-apart distance dc between the width (X)-directional center of the sheet P and the width (X)-directional center of the first adjustment image D1 indicated by the center image D1b formed on the sheet P after being subjected to the test processing is 0, the three straight lines are arranged such that a fold line formed when the sheet P is double-folded (mountain-folded) along a width (X)-directional center line thereof is located on the center reference point P1b, as depicted in FIG. 11A.

In a case where the fold line formed when the sheet P is double-folded (mountain-folded) along the width (X)-directional center line thereof intersects an intersection point between one straight line associated with one of the adjustment values indicated by the center adjustment value image A1b, among the plurality of straight lines indicated by the center scale image M1b, and the straight line indicated by the center determination image J1b, the adjustment value designates a value for adjusting the relative distance MG so as to enable the spaced-apart distance dc between the width (X)-directional center of the sheet P indicated by the fold line and the width (X)-directional center of the first adjustment image D1 indicated by the center image D1b formed on the sheet P after being subjected to the test processing to become 0.

Therefore, when the fold line formed when the sheet P after being subjected to the test processing is double-folded (mountain-folded) along the width (X)-directional center line thereof is located on the center reference point P1b, the user determines, in the step S11, that the spaced-apart distance dc is 0.

As a different situation, assume that the test processing is performed, for example, in the situation where the printing unit 21 is disposed with a rightward deviation with respect to its preset disposed position, and thereby an actual value of the relative distance MG becomes less than the setup value MG0 of the relative distance MG stored in the storage unit 70, as mentioned above with reference to FIG. 5C. In this situation, in the step S7, the print image PD generated in the step S6 is formed on the sheet P such that the width (X)-directional center of the print image PD is located with a rightward deviation with respect to the width (X)-directional center of the sheet P. Thus, the fold line formed when the sheet P after being subjected to the test processing is double-folded (mountain-folded) along the width (X)-directional center line thereof intersects an intersection point Z1b between one straight line lying on the side of the leading edge of the first adjustment image D1 with respect to the straight line including the center reference point P1b, among the plurality of straight lines indicated by the center scale image M1b, and the straight line indicated by the center determination image Jib, as depicted in FIG. 11B.

In this case, the fold line formed when the sheet P after being subjected to the test processing is double-folded (mountain-folded) along the width (X)-directional center line thereof is not located on the center reference point P1b. Thus, in the step S11, the user determines that the spaced-apart distance dc is not 0. Then, in the step S12, through the use of the edit field for the setup value MG0 of the relative distance MG stored in the storage unit 70, the user adds the adjustment value associated with the straight line including the intersection point Z1b, to the setup value MG0 entered in the edit field.

Here, among the plurality of straight lines indicated by the center scale image M1b, a straight line lying close to the leading edge of the first adjustment image D1 with respect to the straight line including the center reference point P1b is associated with a negative adjustment value whose absolute value becomes larger toward the leading edge of the first adjustment image D1. Specifically, even in a situation where the printing unit 21 is disposed with a large rightward deviation with respect to its preset disposed position, and thereby an actual value of the relative distance MG becomes significantly less than the setup value MG0 of the relative distance MG stored in the storage unit 70, the adjustment values can be set to enable the adjustment to be adequately performed such that the setup value MG0 is more largely reduced as the fold line more largely deviates leftwardly with respect to the center reference point P1b.

Further, assume that the test processing is performed, for example, in the situation where the printing unit 21 is disposed with a leftward deviation with respect to its preset disposed position, and thereby an actual value of the relative distance MG becomes greater than the setup value MG0 of the relative distance MG stored in the storage unit 70, as mentioned above with reference to FIG. 5B. In this situation, in the step S7, the print image PD generated in the step S6 is formed on the sheet P such that the width (X)-directional center of the print image PD is located with a leftward deviation with respect to the width (X)-directional center of the sheet P. Thus, the fold line formed when the sheet P after being subjected to the test processing is double-folded (mountain-folded) along the width (X)-directional center line thereof intersects an intersection point between one straight line (e.g., a straight line associated with the adjustment value "0.1" presented in FIG. 11B) lying on the side of the trailing edge of the first adjustment image D1 with respect to the straight line including the center reference point P1b, among the plurality of straight lines indicated by the center scale image M1b, and the straight line indicated by the center determination image Jib.

In this case, the fold line formed when the sheet P after being subjected to the test processing is double-folded (mountain-folded) along the width (X)-directional center line thereof is not located on the center reference point P1b. Thus, in the step S11, the user determines that the spaced-apart distance dc is not 0. Then, in the step S12, through the use of the edit field for the setup value MG0 of the relative distance MG stored in the storage unit 70, the user adds the adjustment value (e.g., "0.1") associated with the straight line including the intersection point, to the setup value MG0 entered in the edit field.

Here, among the plurality of straight lines indicated by the center scale image M1b, a straight line lying close to the trailing edge of the first adjustment image D1 with respect to the straight line including the center reference point P1b is associated with a positive adjustment value which becomes larger toward the trailing edge of the first adjustment image D1. Specifically, even in a situation where the printing unit 21 is disposed with a large leftward deviation with respect to its preset disposed position, and thereby an actual value of the relative distance MG becomes significantly greater than the setup value MG0 of the relative distance MG stored in the storage unit 70, the adjustment values can be set to enable the adjustment to be adequately performed such that the setup value MG0 is more largely increased as the fold line more largely deviates rightwardly with respect to the center reference point P1b.

<Adjustment Method Based on Difference dt>

The following description will be made about an adjustment method for the setup values of the spaced-apart distance LH and the conveyance time period TT each stored in the storage unit 70, based on the difference dt between the third distance L3 and the conveyance (Y)-directional length of the margin region lying along the leading edge of the sheet P.

Figure 12A:
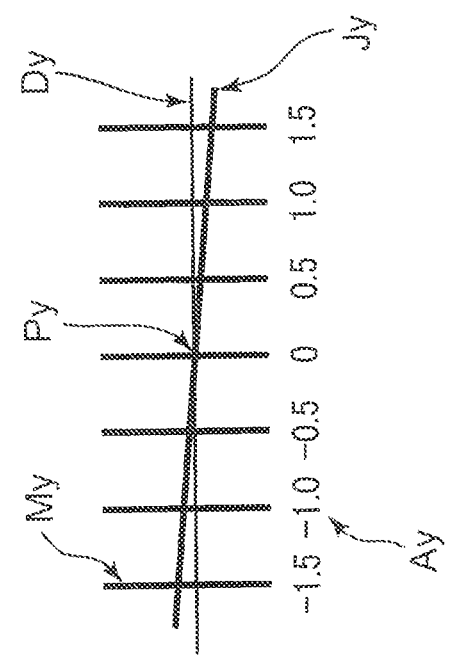
FIG. 12A is an explanatory diagram for adjustment method based on the conveyance-directional length of a margin region lying along the leading edge of a sheet after being subjected to the test processing.
Figure 12B:
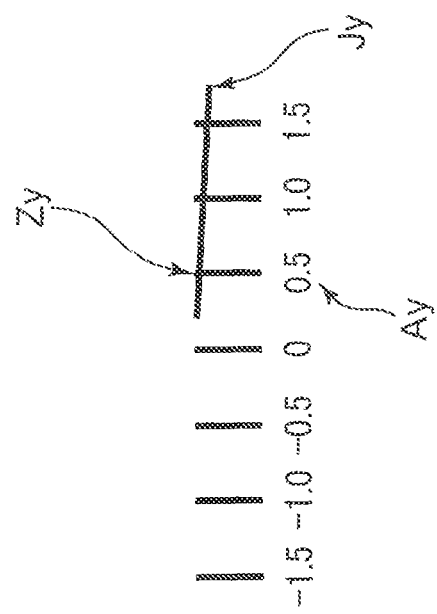
FIG. 12B is an explanatory diagram for the adjustment method based on the conveyance-directional length of the margin region lying along the leading edge of a sheet after being subjected to the test processing.

FIGS. 12A and 12B are explanatory diagrams for the adjustment method based on the conveyance (Y)-directional length of the margin region lying along the leading edge of the sheet P after being subjected to the test processing. As depicted in FIGS. 8 and 12A, the straight line indicated by the leading edge image Dy, the straight line indicated by the leading edge determination image Jy, and one straight line associated with the adjustment value "0" indicated by the leading edge adjustment value image Ay, among the plurality of straight lines indicated by the leading edge scale image My, are disposed to intersect each other at a leading edge reference point Py. That is, in a case where a margin region having a conveyance (Y)-directional length equal to the third distance L3 is formed along the leading edge of the sheet P after being subjected to the test processing, and the difference dt between the third distance L3 and the conveyance (Y)-directional length LT of this margin region is 0, the above three straight lines are arranged such that a trailing edge of the margin region is located on the leading edge reference point Py.

In a case where the trailing edge of the margin region lying along the leading edge of the sheet P after being subjected to the test processing intersects an intersection point between one straight line associated with one of the adjustment values indicated by the leading edge adjustment value image Ay, among the plurality of straight lines indicated by the leading edge scale image My, and the straight line indicated by the leading edge determination image Jy, the adjustment value designates a value for adjusting the spaced-apart distance LH so as to enable the difference dt between the third distance L3 and the conveyance (Y)-directional length of the margin region to become 0.

Therefore, when the trailing edge of the margin region lying along the leading edge of the sheet P after being subjected to the test processing is located on the leading edge reference point Py, the user determines, in the step S11, that the difference dt is 0.

As a different situation, for example, there is the situation where the printing unit 21 is disposed at a position upstream of its preset disposed position in the conveyance direction Y, and thereby an actual value of the spaced-apart distance LH becomes less than the setup value of the spaced-apart distance LH stored in the storage unit 70, as mentioned above with reference to FIG. 6C. In another respect, there is the situation where an actual value of the conveyance time period TT necessary for conveying the sheet P by the spaced-apart distance LH from the detection section 16 to the printing unit 21 becomes less than the setup value of the conveyance time period TT stored in the storage unit 70. If the test processing is performed in this situation, the test processing in the step S7 starts after the leading edge of the sheet P passes through the printing unit 21, so that a margin region having a conveyance (Y)-directional length greater than the third distance L3 will lie along the leading edge of the sheet P after being subjected to the test processing. As a result, as depicted, for example, in FIG. 12B, a trailing edge of the margin region intersects an intersection point Zy between one straight line lying rightwardly with respect to the straight line including the leading edge reference point Py, among the plurality of straight lines indicated by the leading edge scale image My, and the straight line indicated by the leading edge determination image Jy.

In this case, the trailing edge of the margin region is not located on the leading edge reference point Py. Thus, in the step S11, the user determines that the difference dt is not 0. Then, in the step S12, through the use of the edit field for the setup value of the spaced-apart distance LH, the user subtracts the adjustment value associated with the straight line including the intersection point Zy, from the setup value entered in the edit field.

Further, the adjustment processing part 43 operates to divide the setup value of the spaced-apart distance LH after the subtraction of the above adjustment value, by a given conveyance speed of the sheet P, and enter a result of the division into the edit field for the setup value of the conveyance time period TT. In this way, the adjustment processing part 43 is operable to automatically adjust the setup value of the conveyance time period TT in conjunction with the adjustment of the setup value of the spaced-apart distance LH. Alternatively, the user may perform operation of dividing the adjusted setup value of the spaced-apart distance LH by a given conveyance speed of the sheet P, and manually input a result of the operation into the edit field for the setup value of the conveyance time period TT, through the manipulation unit 50.

Here, among the plurality of straight lines indicated by the leading edge scale image My, a straight line lying close to the right edge of the first adjustment image D1 with respect to the straight line including the leading edge reference point Py is associated with a positive adjustment value which becomes larger toward the right edge of the first adjustment image D1. Specifically, even in a situation where the printing unit 21 is disposed with a large deviation toward an upstream side in the conveyance direction Y with respect to its preset disposed position, and thereby an actual value of the spaced-apart distance LH becomes significantly less than the setup value of the spaced-apart distance LH stored in the storage unit 70, the adjustment values can be set to enable the adjustment to be adequately performed such that the setup value of the spaced-apart distance LH is more largely reduced as the trailing edge of the margin region more largely deviates in the direction opposite to the conveyance direction Y with respect to the leading edge reference point Py.

Further, for example, there is the situation where the printing unit 21 is disposed at a position downstream of its preset disposed position in the conveyance direction Y, and thereby an actual value of the spaced-apart distance LH becomes greater than the setup value of the spaced-apart distance LH stored in the storage unit 70, as mentioned above with reference to FIG. 6B. In another respect, there is the situation where an actual value of the conveyance time period TT necessary for conveying the sheet P by the spaced-apart distance LH from the detection section 16 to the printing unit 21 becomes greater than the setup value of the conveyance time period TT stored in the storage unit 70. If the test processing is performed in this situation, the test processing in the step S7 starts before the leading edge of the sheet P passes through the printing unit 21, so that a margin region having a conveyance (Y)-directional length less than the third distance L3 will lie along the leading edge of the sheet P after being subjected to the test processing. As a result, a trailing edge of the margin region intersects an intersection point between one straight line lying leftwardly with respect to the straight line including the leading edge reference point Py, among the plurality of straight lines indicated by the leading edge scale image My, and the straight line indicated by the leading edge determination image Jy.

In this case, the trailing edge of the margin region is not located on the leading edge reference point Py. Thus, in the step S11, the user determines that the difference dt is not 0. Then, in the step S12, through the use of the edit field for the setup value of the spaced-apart distance LH, the user subtracts the adjustment value (e.g., −0.5) associated with the straight line including the intersection point, from the setup value entered in the edit field. Further, the adjustment processing part 43 operates to divide the setup value of the spaced-apart distance LH after the subtraction of the above adjustment value, by the given conveyance speed of the sheet P, and enter a result of the division into the edit field for the setup value of the conveyance time period TT. In this way, the adjustment processing part 43 is operable to automatically adjust the setup value of the conveyance time period TT in conjunction with the adjustment of the setup value of the spaced-apart distance LH. Alternatively, the user may perform operation of dividing the adjusted setup value of the spaced-apart distance LH by a given conveyance speed of the sheet P, and manually input a result of the operation into the edit field for the setup value of the conveyance time period TT, through the manipulation unit 50.

Here, among the plurality of straight lines indicated by the leading edge scale image My, a straight line lying close to the left edge of the first adjustment image D1 with respect to the straight line including the leading edge reference point Py is associated with a negative adjustment value whose absolute value becomes larger toward the left edge of the first adjustment image D1. Specifically, even in a situation where the printing unit 21 is disposed with a large deviation toward a downstream side in the conveyance direction Y with respect to its preset disposed position, and thereby an actual value of the spaced-apart distance LH becomes significantly greater than the setup value of the spaced-apart distance LH stored in the storage unit 70, the adjustment values can be set to enable the adjustment to be adequately performed such that the setup value of the spaced-apart distance LH is more largely increased as the trailing edge of the margin region more largely deviates in the conveyance direction Y with respect to the leading edge reference point Py.

As above, in the adjustment method according to the first embodiment, even in the situation where the printing unit 21 and the imaging unit 14 are not located at their disposed positions, the adjustment processing can be performed to adjust respective setup values of the relative distance MG, the spaced-apart distance LH and the conveyance time period TT each stored in the storage unit 70, such that each of the difference ds, the spaced-apart distance dc and the difference dt becomes 0, as in the situation where the printing unit 21 and the imaging unit 14 are located at their disposed positions. This makes it possible to form the print image PD at a proper position, as in the situation where the printing unit 21 and the imaging unit 14 are located at their disposed positions.

Second Embodiment

Next, a second embodiment of an adjustment method in accordance with the present disclosure will be described. In the following description, the same element or component as that in the first embodiment is assigned with the same reference sign as that in the first embodiment, and description thereof will be omitted.

As a different situation from the first embodiment, in the second embodiment, the adjustment processing part 43 is operable, in the steps S6 in FIG. 7, to cause the generation processing part 41 to generate the print image PD by superimposing the outline image RD on the aftermentioned second adjustment image D2 (adjustment image) preliminarily stored in the storage unit 70 in place of the first adjustment image D1, such that a left edge of the second adjustment image D2 becomes coincident with the left edge of the outline image RD, based on the setup value MG0 of the relative distance MG preliminarily stored in the storage unit 70. Further, the adjustment processing part 43 is operable to change, to a margin region, a region of the print image PD between each of opposite lateral edges thereof and a position spaced apart from the lateral edge in the width direction X by a second distance L2.

In the second embodiment, the adjustment processing part 43 is further operable, in the steps S11 and S12 in FIG. 7, to adjust the setup value of the relative distance MG stored in the storage unit 70, such that each of a difference between the second distance L2 and the width (X)-directional length of the margin region lying along each of the opposite lateral edges of the sheet P after being subjected to the test processing, and a spaced-apart distance between the width (X)-directional center of the sheet P and the width (X)-directional center of the second adjustment image D2 represented by the center image D2b formed on the sheet P after being subjected to the test processing becomes 0.

FIG. 13 is a diagram depicting one example of the second adjustment image D2. Specifically, as depicted in FIG. 13, the second adjustment image D2 includes two offset images D2a, D2c each indicating a straight line which extends in the conveyance direction Y and represents a position spaced apart from each of the opposite lateral edges thereof in the width direction X by the second distance L2. Further, the second adjustment image D2 includes a center image D2b indicating a straight line which extends in the conveyance direction Y and represents the width (X)-directional center thereof, in the same manner as that in the center image D1b of the first adjustment image D1. Further, the second adjustment image D2 includes a leading edge image Dy in the same manner as that in the leading edge image Dy of the first adjustment image D1. Here, the second distance L2 is preliminarily stored in the storage unit 70 or the like.

Further, the second adjustment image D2 includes: two offset scale images M2a, M2c each indicating a plurality of straight lines orthogonal to the straight line indicated by a corresponding one of the offset images D2a, D2c; and two offset determination images J2a, J2c each indicating a straight line which intersects the straight line indicated by a corresponding one of the offset images D2a, D2c and the plurality of straight lines indicated by a corresponding one of the offset scale images M2a, M2c. Further, the second adjustment image D2 includes two offset adjustment value images A2a, A2c each indicating adjustment values associated, respectively, with the plurality of straight lines indicated by a corresponding one of the offset scale images M2a, M2c.

Further, as with the center scale image M1b, the center determination image J1b and the center adjustment value image A1b of the first adjustment image D1, the second adjustment image D2 comprises: a center scale image M2b indicating a plurality of straight lines orthogonal to the straight line indicated by the center image D2b; a center determination image J2b indicating a straight line which intersects the straight line indicated by the center image D2b and the plurality of straight lines indicated by the center scale image M2b; and a center adjustment value image A2b indicating adjustment values associated, respectively, with the plurality of straight lines indicated by the center scale image M2b. Further, the second adjustment image D2 includes a leading edge scale image My, a leading edge determination image Jy, and a leading edge adjustment value image Ay, in the same manner as those of the first adjustment image D1.

Figure 14A:
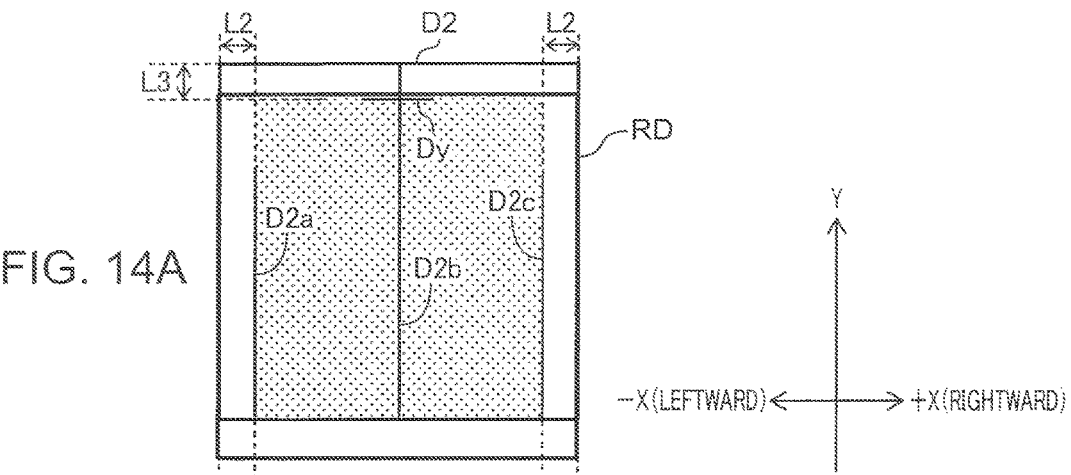
FIG. 14A is an explanatory diagram for test processing to be performed using the second adjustment image.
Figure 14B:
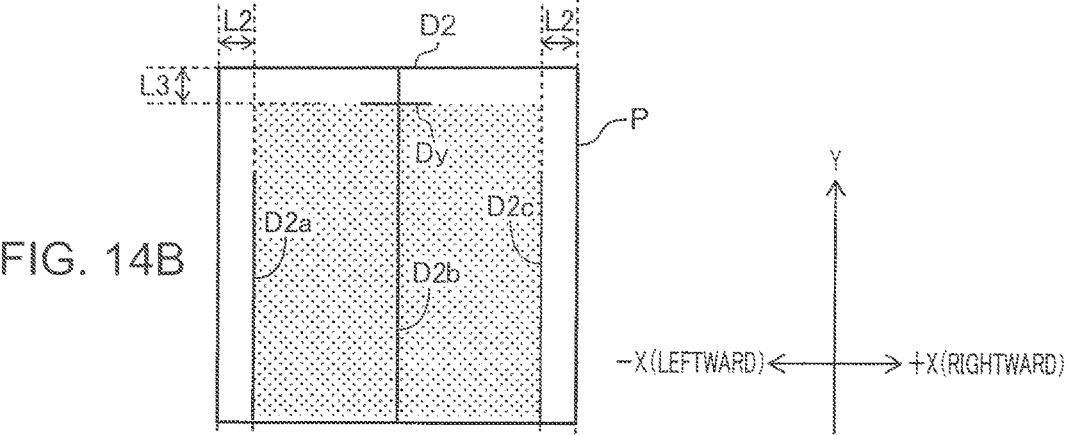
FIG. 14B is an explanatory diagram for the test processing to be performed using the second adjustment image.
Figure 14C:
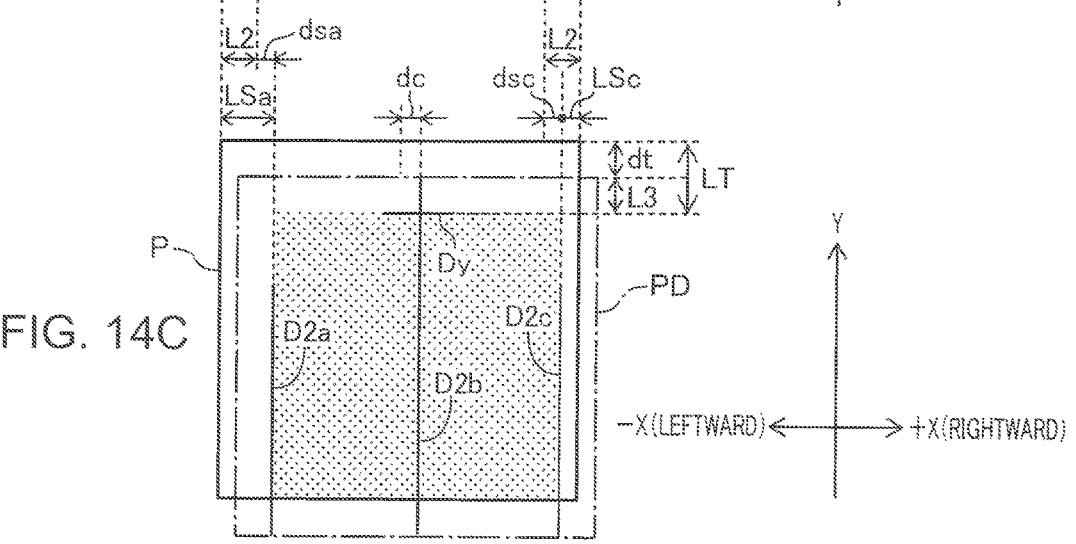
FIG. 14C is an explanatory diagram for the test processing to be performed using the second adjustment image.

The following description will be made about test processing to be performed using the second adjustment image D2. FIGS. 14A, 14B and 14C are explanatory diagrams for the test processing to be performed using the second adjustment image D2. Assume that the test processing is performed when the detection unit 16 and the printing unit 21 are located, respectively, at their preset disposed positions in the conveyance direction Y of the sheet P, and thereby the spaced-apart distance LH and the conveyance time period TT each stored in the storage unit 70 are correct. In this situation, the leading edge of the sheet P reaches the printing unit 21 at the printing start time, and the sheet P is conveyed by the third distance L3 in the period from the printing start time through until the first time period T1 elapses. As a result of performing the step S5 during the above period, a region of the second adjustment image D2 from the leading edge of the second adjustment image D2 to the position spaced apart from the leading edge in the direction opposite to the conveyance direction Y by the third distance L3 is changed to a margin region in increments of the given lines, as depicted in FIG. 14A. Therefore, as a result of performing the step S7, a margin region having a conveyance (Y)-directional length equal to the third distance L3 lies along the leading edge of the sheet P, and the leading edge image Dy is formed at the position spaced apart from the leading edge of the sheet P in the direction opposite to the conveyance direction Y by the third distance L3, as depicted in FIG. 14B. That is, a difference between the third distance L3 and the conveyance (Y)-directional length LT of the margin region lying along the leading edge of the sheet P becomes 0.

Subsequently, in the step S6, the outline image RD is superimposed on the second adjustment image D2 such that the left edge of the second adjustment image D2 and the left edge of the outline image RD are brought into coincidence with each other, based on the setup value MG0 of the relative distance MG preliminarily stored in the storage unit 70. Then, the print image PD is generated in a state in which a region of the second adjustment image D2 uncovered by the outline image RD in the superimposed state is changed to a margin region, as depicted in FIG. 14A. Further, a region of the print image PD between each of opposite lateral edges of the print image PD and a position spaced apart from the lateral edge in the width direction X by the second distance L2 is changed to a margin region. Therefore, in the step S7, a margin region having a width (X)-directional length equal to the second distance L2 is formed along each of opposite lateral edges of the sheet P, and the center image D2$b$ and each of the offset images D2$a$, D2$c$ are formed, respectively, at the width (X)-directional center of the sheet P, and a position spaced apart from a corresponding one of the opposite edges of the sheet P by the second distance L2, as depicted in FIG. 14B. That is, a difference between the second distance L2 and the width (X)-directional length of the margin region lying along each of the opposite lateral edges of the sheet P becomes 0. Further, a spaced-apart distance between the width (X)-directional center of the sheet P and the width (X)-directional center of the second adjustment image D2 indicated by the center image D2$b$ formed on the sheet P becomes 0.

As a different situation, assume that the test processing is performed in the situation where the imaging unit 14 is disposed at a position different from its preset disposed position, as mentioned above with reference to FIGS. 4B and 4C. In this situation, in the step S6, the outline image RD is superimposed on the second adjustment image D2, based on the incorrect setup value MG0 of the relative distance MG preliminarily stored in the storage unit 70, so that the print image PD is formed in a state in which a region of the second adjustment image D2 between each of the opposite lateral edges of the second adjustment image D2 and a position spaced apart from the lateral edge by a distance different from the second distance L2 is changed to a margin region. Then, the printing processing in the step S7 is performed. As a result, a margin region having a width (X)-directional length different from the second distance L2 lies along each of the opposite lateral edges of the sheet P, as depicted, for example, in FIG. 14C, so that a difference (dsa, dsc) between the second distance L2 and the width (X)-directional length (LSa, LSc) of this margin region becomes non-0.

Further, assume that the test processing is performed in the situation where the printing unit 21 is located at a position different from its preset disposed position, and thereby the setup value MG0 of the relative distance MG preliminarily stored in the storage unit 70 is incorrect, as mentioned above with reference to FIGS. 5B and 5C. In this situation, in the printing processing in the step S7, the print image is formed on the sheet P, such that the width (X)-directional center of the print image PD becomes coincident with the width (X)-directional center of the sheet P, based on the incorrect setup value MG0 of the relative distance MG. As a result, a spaced-apart distance dc between the width (X)-directional center of the sheet P and the width (X)-directional center of the second adjustment image D2 indicated by the center image D2$b$ formed on the sheet P becomes non-0, as depicted, for example, in FIG. 14C.

Further, assume that the detection unit 16 or the printing unit 21 is located at a position different from its preset disposed position in the conveyance direction of the sheet P, and thereby the conveyance time period TT stored in the storage unit 70 is incorrect, as mentioned above with reference to FIGS. 6B and 6C. As a result of performing the test processing in this situation, at the printing start time, the position of the leading edge of the sheet P is located at a position different from the position of the printing unit 21. Thus, when the sheet P is conveyed by the third distance L3 in the period from the printing start time through until the first time period T1 elapses, a position spaced apart from the leading edge of the sheet P in the direction opposite to the conveyance direction Y by the third distance L3 is located at a position different from the position of the printing unit 21. Therefore, in the steps S5 and S7, a region of the second adjustment image D2 from the leading edge of the second adjustment image D2 to a position spaced apart from the leading edge in the direction opposite to the conveyance direction Y by a distance different from the third distance L3 is converted to a margin region in increments of the given lines, so that a margin region having a conveyance (Y)-directional length different from the third distance L3 lies along the leading edge of the sheet P, as depicted, for example, in FIG. 14C. That is, a difference dt between the third distance L3 and the conveyance (Y)-directional length LT of the margin region lying along the leading edge of the sheet P becomes non-0.

Details of an adjustment method for the setup values of the relative distance MG, the spaced-apart distance LH and the conveyance time period TT each stored in the storage unit 70, in the steps S11 and S12, will be described below. A method of adjusting the setup value MG0 of the relative distance MG stored in the storage unit 70, such that the spaced-apart distance dc between the width (X)-directional center of the sheet P and the width (X)-directional center of the second adjustment image D2 represented by the center image D2$b$ formed on the sheet P after being subjected to the test processing becomes 0 is the same as the method of adjusting the setup value MG0 of the relative distance MG stored in the storage unit 70, such that the spaced-apart distance dc between the width (X)-directional center of the sheet P and the width (X)-directional center of the first adjustment image D1 becomes 0, as described in the first embodiment, and therefore description thereof will be omitted. A method of adjusting the setup values of the spaced-apart distance LH and the conveyance time period TT, using the leading edge image Dy of the second adjustment image D2, is also the same as the method in the first embodiment, and therefore description thereof will be omitted.

<Adjustment Method Based on Differences dsa, dsc>

The following description will be made about an adjustment method for the setup value MG0 of the relative distance MG stored in the storage unit 70, based on the difference (dsa, dsc) between the second distance L2 and the width (X)-directional length (LSa, LSc) of the margin region lying along each of the opposite lateral edges of the sheet P after being subjected to the test processing.

FIGS. 15A, 15B, 15C and 15D are explanatory diagrams for an adjustment method based on the difference (dsa, dsc) between the second distance L2 and the width (X)-directional length (LSa, LSc) of the margin region lying along each of the opposite lateral edges of the sheet P after being subjected to the test processing. As depicted in FIGS. 13 and 15A, a left edge region of the second adjustment image D2 includes the offset image D2$a$ indicating a straight line which extends in the conveyance direction Y and represents a position spaced apart from the left edge thereof in the width direction X by the second distance L2, and the offset scale image M2$a$ indicating a plurality of straight lines orthogonal to the straight line indicated by the offset image D2a. The left edge region of the second adjustment image D2 further includes the offset determination image J2a indicating a straight line which intersects the straight line indicated by the offset image D2a and the plurality of straight lines indicated by the offset scale image M2a, and the offset adjustment value image A2a indicating adjustment values associated, respectively, with the plurality of straight lines indicated by the offset scale image M2a.

Similarly, as depicted in FIGS. 13 and 15C, a right edge region of the second adjustment image D2 includes the offset image D2c indicating a straight line which extends in the conveyance direction Y and represents a position spaced apart from the right edge thereof in the width direction X by the second distance L2, and the offset scale image M2c indicating a plurality of straight lines orthogonal to the straight line indicated by the offset image D2c. The right edge region of the second adjustment image D2 further includes the offset determination image J2c indicating a straight line which intersects the straight line indicated by the offset image D2c and the plurality of straight lines indicated by the offset scale image M2c, and the offset adjustment value image A2c indicating adjustment values associated, respectively, with the plurality of straight lines indicated by the offset scale image M2c.

The straight line indicated by the offset image D2a, and one straight line associated with the adjustment value "39" indicated by the offset adjustment value image A2a, among the plurality of straight lines indicated by the offset scale image M2a, are disposed to intersect each other at a second reference point P2a. That is, in a case where a margin region having a width (X)-directional length equal to the second distance L2 is formed along the left edge of the sheet P after being subjected to the test processing, and the difference dsa between the second distance L2 and the width (X)-directional length LSa of this margin region is 0, the above three straight lines are arranged such that a right edge of the margin region is located on the second reference point P2a.

In a case where the right edge of the margin region lying along the left edge of the sheet P after being subjected to the test processing intersects an intersection point between one straight line associated with one of the adjustment values indicated by the offset adjustment value image A2a, among the plurality of straight lines indicated by the offset scale image M2a, and the straight line indicated by the offset determination image J2a, the adjustment value designates a value for adjusting the relative distance MG so as to enable the difference dsa between the second distance L2 and the width (X)-directional length of the margin region to become 0.

The straight line indicated by the offset image D2c, and one straight line associated with the adjustment value "39" indicated by the offset adjustment value image A2c, among the plurality of straight lines indicated by the offset scale image M2c, are disposed to intersect each other at a third reference point P2c. That is, in a case where a margin region having a width (X)-directional length equal to the second distance L2 is formed along the right edge of the sheet P after being subjected to the test processing, and the difference dsc between the second distance L2 and the width (X)-directional length LSc of this margin region is 0, the above three straight lines are arranged such that a left edge of the margin region is located on the third reference point P2c.

In a case where the left edge of the margin region lying along the right edge of the sheet P after being subjected to the test processing intersects an intersection point between one straight line associated with one of the adjustment values indicated by the offset adjustment value image A2c, among the plurality of straight lines comprised in the offset scale image M2c, and the straight line indicated by the offset determination image J2c, the adjustment value designates a value for adjusting the relative distance MG so as to enable the difference dsc between the second distance L2 and the width (X)-directional length of the margin region to become 0.

Therefore, when the right edge of the margin region lying along the left edge of the sheet P after being subjected to the test processing is located on the second reference point P2a, the user determines, in the step S11, that the difference dsa is 0. Further, when the left edge of the margin region lying along the right edge of the sheet P after being subjected to the test processing is located on the third reference point P2c, the user determines, in the step S11, that the difference dsc is 0.

As a different situation, assume that the test processing is performed, for example, in the situation where the imaging unit 14 is disposed with a leftward deviation with respect to its preset disposed position, and thereby an actual value of the relative distance MG becomes less than the setup value MG0 of the relative distance MG stored in the storage unit 70, as mentioned above with reference to FIG. 4C. In this situation, the outline image RD taken with a rightward deviation is superimposed on the second adjustment image D2 to generate the print image PD in the step S6, and the generated print image PD is formed on the sheet P in the step S7. Thus, a margin region having a width (X)-directional length greater than the second distance L2 lies along the left edge of the sheet P after being subjected to the test processing, and a margin region having a width (X)-directional length less than the second distance L2 lies along the right edge of the sheet P after being subjected to the test processing.

As a result, as depicted, for example, in FIG. 15B, a right edge of the margin region lying along the left edge of the sheet P intersects an intersection point Z2a between one straight line lying on the side of the leading edge of the second adjustment image D2 with respect to the straight line including the second reference point P2a, among the plurality of straight lines indicated by the offset scale image M2a, and the straight line indicated by the offset determination image J2a. On the other hand, as depicted in FIG. 15D, a left edge of the margin region lying along the right edge of the sheet P intersects an intersection point Z2c between one straight line lying on the side of the trailing edge of the second adjustment image D2 with respect to the straight line including the third reference point P2c, among the plurality of straight lines indicated by the offset scale image M2c, and the straight line indicated by the offset determination image J2c.

In this case, the right edge of the margin region lying along the left edge of the sheet P is not located on the second reference point P2a. Thus, in the step S11, the user determines that the difference dsa is not 0. Further, the left edge of the margin region lying along the right edge of the sheet P is not located on the third reference point P2c. Thus, the user determines that the difference dsc is not 0.

Then, in the step S12, through the use of the edit field for the setup value MG0 of the relative distance MG stored in the storage unit 70, the user adds an adjustment value AD calculated by the following formula (2), using the adjustment value ADa (nor presented in the figures) associated with the straight line including the intersection point Z2a, and the adjustment value ADc (nor presented in the figures)

associated with the straight line including the intersection point Z2c, to the setup value MG0 entered in the edit field.

$$AD=(ADa-ADc)/2 \qquad (2)$$

Further, assume that the test processing is performed, for example, in the situation where the imaging unit 14 is disposed with a rightward deviation with respect to its preset disposed position, and thereby an actual value of the relative distance MG becomes greater than the setup value MG0 of the relative distance MG stored in the storage unit 70, as mentioned above with reference to FIG. 4B.

In this situation, the outline image RD taken with a leftward deviation is superimposed on the second adjustment image D2 to generate the print image PD in the step S6, and the generated print image PD is formed on the sheet P in the step S7. Thus, a margin region having a width (X)-directional length less than the second distance L2 lies along the left edge of the sheet P after being subjected to the test processing, and a margin region having a width (X)-directional length greater than the second distance L2 lies along the right edge of the sheet P after being subjected to the test processing.

As a result, a right edge of the margin region lying along the left edge of the sheet P intersects an intersection point between one straight line lying on the side of the trailing edge of the second adjustment image D2 with respect to the straight line including the second reference point P2a, among the plurality of straight lines indicated by the offset scale image M2a, and the straight line indicated by the offset determination image J2a. On the other hand, a left edge of the margin region lying along the right edge of the sheet P intersects an intersection point between one straight line lying on the side of the leading edge of the second adjustment image D2 with respect to the straight line including the third reference point P2c, among the plurality of straight lines comprised in the offset scale image M2c, and the straight line indicated by the offset determination image J2c.

In this case, the right edge of the margin region lying along the left edge of the sheet P is not located on the second reference point P2a. Thus, in the step S11, the user determines that the difference dsa is not 0. Further, the left edge of the margin region lying along the right edge of the sheet P is not located on the third reference point P2c. Thus, the user determines that the difference dsc is not 0.

Then, in the step S12, through the use of the edit field for the setup value MG0 of the relative distance MG stored in the storage unit 70, the user adds an adjustment value AD calculated by the formula (2), using the adjustment value ADa (nor presented in the figures), and the adjustment value ADc (nor presented in the figures), to the setup value MG0 entered in the edit field. Here, the above adjustment value ADa (nor presented in the figures) is one adjustment value associated with one straight line including the intersection point between the right edge of the margin region lying along the left edge of the sheet P and the straight line indicated by the offset determination image J2a, among the plurality of straight lines indicated by the offset scale image M2a. Further, the above adjustment value ADc (nor presented in the figures) is one adjustment value associated with one straight line including the intersection point between the left edge of the margin region lying along the right edge of the sheet P and the straight line indicated by the offset determination image J2a, among the plurality of straight lines indicated by the offset scale image M2c.

Here, each of the plurality of straight lines indicated by the offset scale image M2a is associated with a positive adjustment value ADa which becomes larger as the straight line lies closer to the trailing edge of the second adjustment image D2. Similarly, each of the plurality of straight lines indicated by the offset scale image M2c is associated with a positive adjustment value ADb which becomes larger as the straight line lies closer to the trailing edge of the second adjustment image D2. A value obtained using the formula (2), i.e., by dividing a difference between the adjustment value ADa and the adjustment value ADc by two, is added to the setup value MG0 of the relative distance MG.

Specifically, assume that the imaging unit 14 is disposed with a deviation with respect to its preset disposed position, and thereby an actual value of the relative distance MG becomes different from the setup value MG0 of the relative distance MG stored in the storage unit 70. In this case, when the outline image RD is superimposed on the second adjustment image D2 so as to generate the print image PD, the width (X)-directional center of the outline image RD deviates from the width (X)-directional center of the second adjustment image D2. Considering such a situation, the adjustment value is set to enable the amount of this deviation to be figured out from a difference between width (X)-directional deviation amounts of the margin regions along the opposite lateral edges of the sheet P, so as to perform adjustment of adequately increasing and reducing the setup value MG0.

It should be understood that the above first and second embodiments are only examples of an embodiment of the present disclosure, and are not intended to limit the present disclosure to these embodiments. For example, the embodiments may be modified as follows.

(1) Each of the first adjustment image D1 and the second adjustment image D2 may be configured to include at least the leading edge image Dy, the leading edge determination image Jy, the leading edge scale image My, and the leading edge adjustment value image Ay, without including any other image. Along with this, the adjustment prompt screen to be displayed in the step S10 may be configured as a manipulation screen for prompting a user to adjust the setup values of the spaced-apart distance LH and the conveyance time period TT, and allowing the user to perform the adjustment. Specifically, the adjustment prompt screen may be configured to allow the user to perform only manipulation of editing the setup values of the spaced-apart distance LH and the conveyance time period TT such that the difference dt becomes 0, in the steps S11 and S12.

In the above embodiments, the steps S4 and S5 may be omitted, and the step S6 may be performed when a time period indicated by the setup value of the conveyance time period TT has elapsed from a time when the detection unit 16 detected reaching of the leading edge of the sheet P. Along with this, each of the first adjustment image D1 and the second adjustment image D2 may be configured such that the leading edge image Dy, the leading edge determination image Jy, the leading edge scale image My and the leading edge adjustment value image Ay are not included therein. Further, the adjustment prompt screen to be displayed in the step S10 may be configured as a manipulation screen for prompting a user to adjust the setup values of the relative distance MG, and allowing the user to perform the adjustment. Specifically, the adjustment prompt screen may be configured to make it impossible for the user to perform the manipulation of editing the spaced-apart distance LH and the conveyance time period TT such that the difference dt becomes 0, in the steps S11 and S12.

(2) The second adjustment image D2 may be configured such that the offset images D2a, D2c are not included therein. Along with this, the second adjustment image D2 may be configured such that the offset scale images M2a, M2c, the offset determination images J2a, J2c and the offset adjustment value images A2a, A2c are not included therein. In this case, a user may measure the width (X)-directional lengths LSa, LSc of the margin regions lying along the opposite lateral edges of the sheet P, using a ruler or the like in the step S11, and determine whether or not the difference (dsa, dsc) between the second difference L2 and each of the measured lengths LSa, LSc is 0.

(3) The first adjustment image D1 may be configured such that the offset image D1a is not included therein. Along with this, the first adjustment image D1 may be configured such that the offset scale image M1a, the offset determination image J1a and the offset adjustment value image Ala are not included therein. In this case, a user may measure the width (X)-directional length LS of the margin regions lying along the left edge of the sheet P, using a ruler or the like in the step S11, and determine whether or not the difference ds between the first difference L1 and the measured length LS is 0.

The present disclosure can provide a method of adequately adjusting the image formation position.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A method for adjustment of an image formation position in an image forming apparatus, wherein the image forming apparatus includes:
   a printing unit which forms an image on a sheet conveyed thereto;
   an imaging unit which takes an outline image representing an outline of the sheet, at a position upstream of the printing unit in a conveyance direction of the sheet;
   a storage unit which preliminarily stores a relative position of the imaging unit with respect to the printing unit in a width direction orthogonal to the conveyance direction;
   a generation processing part which superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region; and
   a printing processing part which executes printing processing of causing the printing unit to form the print image on the sheet, such that a center of the print image in the width direction becomes coincident with a center of the sheet in the width direction, based on the relative position,
   the method comprising operating a computer of the image forming apparatus, using, as the target image, a given adjustment image including a center image representing a center thereof in the width direction, to:
   perform test processing of causing the generation processing part to generate the print image by superimposing the outline image on the adjustment image after further shifting the outline image in the width direction by a given first distance, and then causing the printing processing part to execute the printing processing; and
   adjust the relative position such that each of a difference between the first distance and a length in the width direction of a margin region lying along the one lateral edge of the sheet, and a spaced-apart distance between the center of the sheet in the width direction and the center of the adjustment image in the width direction, represented by the center image formed on the sheet, becomes 0.

2. The method as recited in claim 1, wherein the adjustment image further includes an offset image representing a position spaced apart from the one lateral edge of the adjustment image in the width direction by the first distance.

3. A method for adjustment of an image formation position in an image forming apparatus, wherein the image forming apparatus includes:
   a printing unit which forms an image on a sheet conveyed thereto;
   an imaging unit which takes an outline image representing an outline of the sheet, at a position upstream of the printing unit in a conveyance direction of the sheet;
   a storage unit which preliminarily stores a relative position of the imaging unit with respect to the printing unit in a width direction orthogonal to the conveyance direction;
   a generation processing part which superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region; and
   a printing processing part which executes printing processing of causing the printing unit to form the print image on the sheet, such that a center of the print image in the width direction becomes coincident with a center of the sheet in the width direction, based on the relative position,
   the method comprising operating a computer of the image forming apparatus, using, as the target image, a given adjustment image including a center image representing a center thereof in the width direction, to:
   perform test processing of causing the generation processing part to generate the print image, and, after changing, to a margin region, a region of the print image from each of opposite lateral edges of the print image to a position spaced apart from the lateral edge in the width direction by a second distance, causing the printing processing part to execute the printing processing; and
   adjust the relative position such that each of a difference between the second distance and a length in the width direction of a margin region lying along each of opposite lateral edges of the sheet, and a spaced-apart distance between the center of the sheet in the width direction and the center of the adjustment image in the width direction, represented by the center image formed on the sheet, becomes 0.

4. The method as recited in claim 3, wherein the adjustment image further includes an offset image representing a position spaced apart from each of opposite lateral edges of the adjustment image in the width direction by the second distance.

5. A method for adjustment of an image formation position in an image forming apparatus, wherein the image forming apparatus includes:

a printing unit which forms an image on a sheet conveyed thereto;

an imaging unit which takes an outline image representing an outline of the sheet, at a position upstream of the printing unit in a conveyance direction of the sheet;

a storage unit which preliminarily stores a relative position of the imaging unit with respect to the printing unit in a width direction orthogonal to the conveyance direction;

a generation processing part which superimposes the outline image taken by the imaging unit on a target image to be formed on the sheet, such that one lateral edge of the target image becomes coincident with one lateral edge of the outline image, based on the relative position, and then generates a print image in a state in which a region of the target image uncovered by the outline image in the superimposed state is changed to a margin region;

a printing processing part which executes printing processing of causing the printing unit to form the print image on the sheet, such that a center of the print image in the width direction becomes coincident with a center of the sheet in the width direction, based on the relative position; and a detection unit which detects that a leading edge of the sheet reaches a given position between the printing unit and the imaging unit in the conveyance direction, and wherein:

the storage unit further preliminarily stores a conveyance time period necessary to convey the sheet from the detection unit to the printing unit;

at a printing start time immediately after the conveyance time period has elapsed from a time when the detection unit detected reaching of the leading edge of the sheet, the generation processing part superimposes the outline image on the target image step-by-step in increments of given lines extending in the width direction to sequentially generate a plurality of segments of the print image each for the given lines; and upon start of generation of the print image by the generation processing part, the printing processing part starts the printing processing to cause the printing unit to sequentially form, on the sheet, the plurality of segments of the print image generated by the generation processing part in increments of the given lines, the method comprising operating a computer of the image forming apparatus, using, as the target image, a given adjustment image including a leading edge image representing a position spaced apart from a leading edge of the adjustment image in a direction opposite to the conveyance direction by a third distance over which the sheet is conveyed in a given first time period, to;

in a period from the printing start time through until the first time period elapses, cause the generation processing part to sequentially generate images each serving as one segment of the print image for given lines, by modifying the adjustment image such that a region thereof corresponding to the given lines is converted to a margin region, without superimposing the outline image on the adjustment image; and after completion of the printing processing, adjust the conveyance time period such that a difference between the third distance and a length in the conveyance direction of a margin region lying along the leading edge of the sheet becomes 0.

* * * * *